United States Patent [19]

Hunter

[11] 4,204,642
[45] May 27, 1980

[54] TRAVELING SPRINKLER SYSTEM AND METHOD

[75] Inventor: Edwin J. Hunter, Rancho Santa Fe, Calif.

[73] Assignee: The Toro Company, San Marcos, Calif.

[21] Appl. No.: 827,787

[22] Filed: Oct. 13, 1977

[51] Int. Cl.² .............................................. B05B 3/18
[52] U.S. Cl. .................................................. 239/191
[58] Field of Search ..................... 239/97, 98, 99, 100, 239/178–192

[56] References Cited

U.S. PATENT DOCUMENTS

| | | | |
|---|---|---|---|
| 1,142,448 | 6/1915 | Lord | 239/191 X |
| 1,651,582 | 12/1927 | Buckner | 239/191 X |
| 1,984,531 | 12/1934 | Kind et al. | 239/99 |
| 2,122,079 | 6/1938 | Wilson | 239/191 X |
| 2,474,071 | 6/1949 | Stetson | 239/183 X |
| 3,321,138 | 5/1967 | Curry | 239/99 |
| 3,729,141 | 4/1973 | Cornelius | 239/97 X |

FOREIGN PATENT DOCUMENTS 1044496  12/1954  Fed. Rep. of Germany ............. 239/99

Primary Examiner—Robert B. Reeves
Assistant Examiner—Gene A. Church
Attorney, Agent, or Firm—Poms, Smith, Lande & Rose

[57] ABSTRACT

A low capital investment system for irrigating a relatively large area field, comprising a mobile base, and a sprinkler mounted on the base and adapted to accumulate water from a water supply and to intermittently discharge accumulated water in an irrigating stream over the field. Apparatus is provided for propelling the base in a back and forth movement traversing a field, and for generally reversing the water discharge direction each time the direction of travel is reversed.

The sprinkler includes a novel, resiliently expandable reservoir construction for accumulating relatively large volume, intermittent bursts, and a drive system which also provides relatively short range, continual irrigation. Separate sprinkler units can be used on a field concurrently, or a single unit can be moved over successive areas of a field until the whole field has been covered. The system may also be combined with a center pivot device to irrigate land that would otherwise be unused.

40 Claims, 43 Drawing Figures

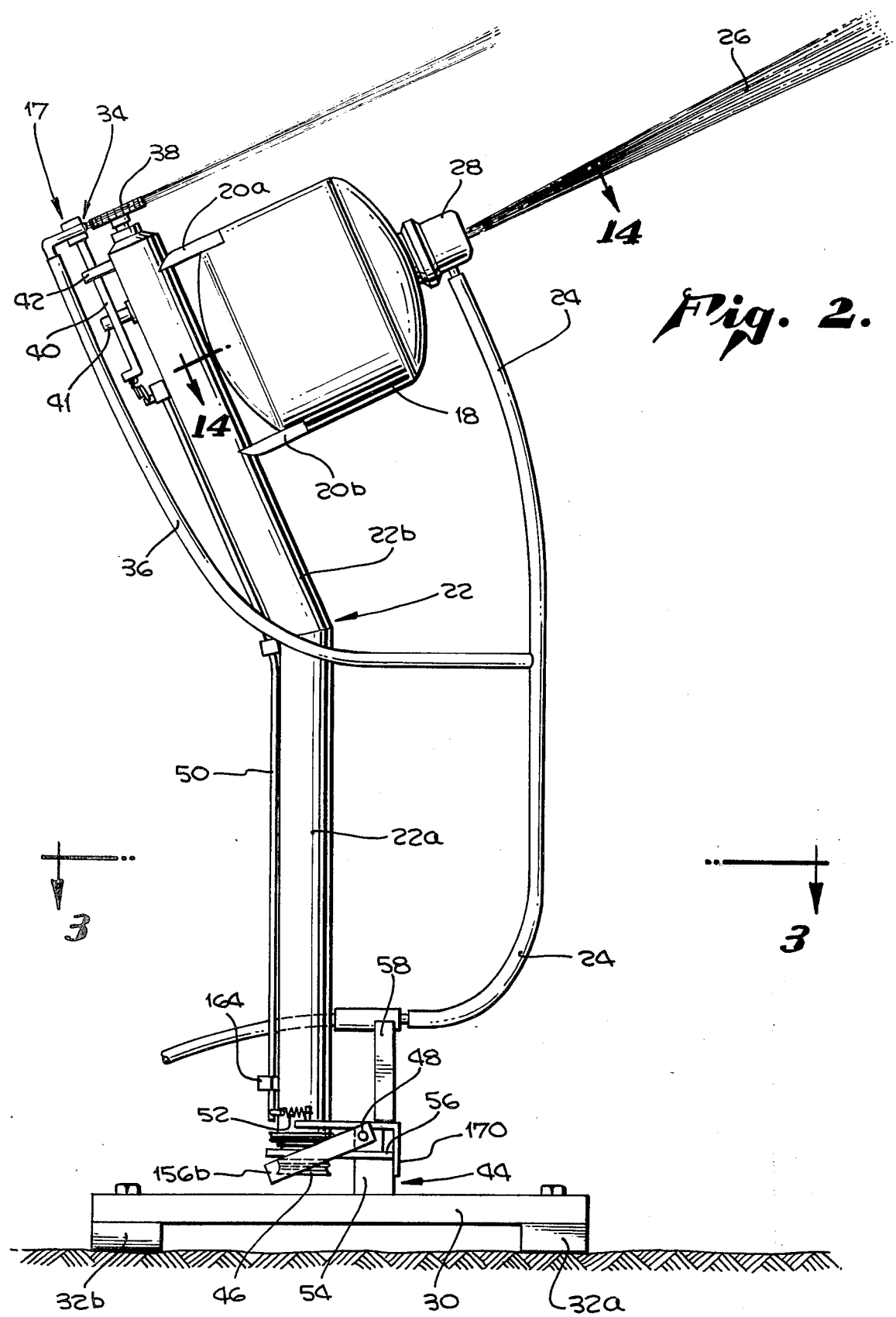

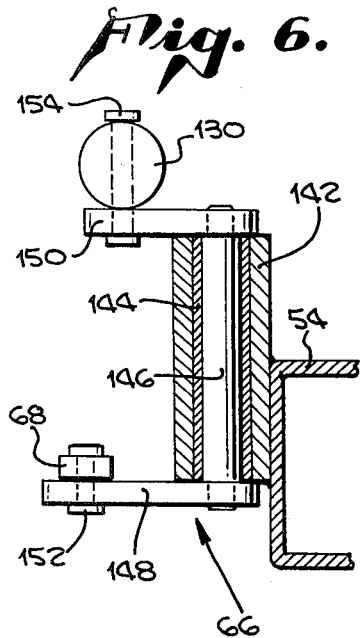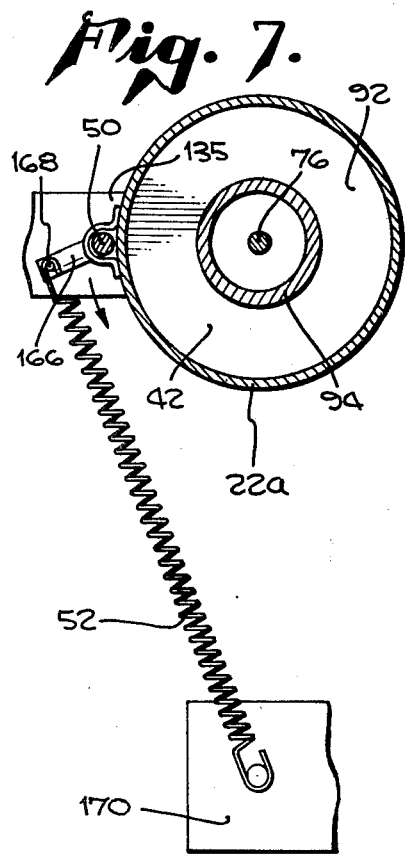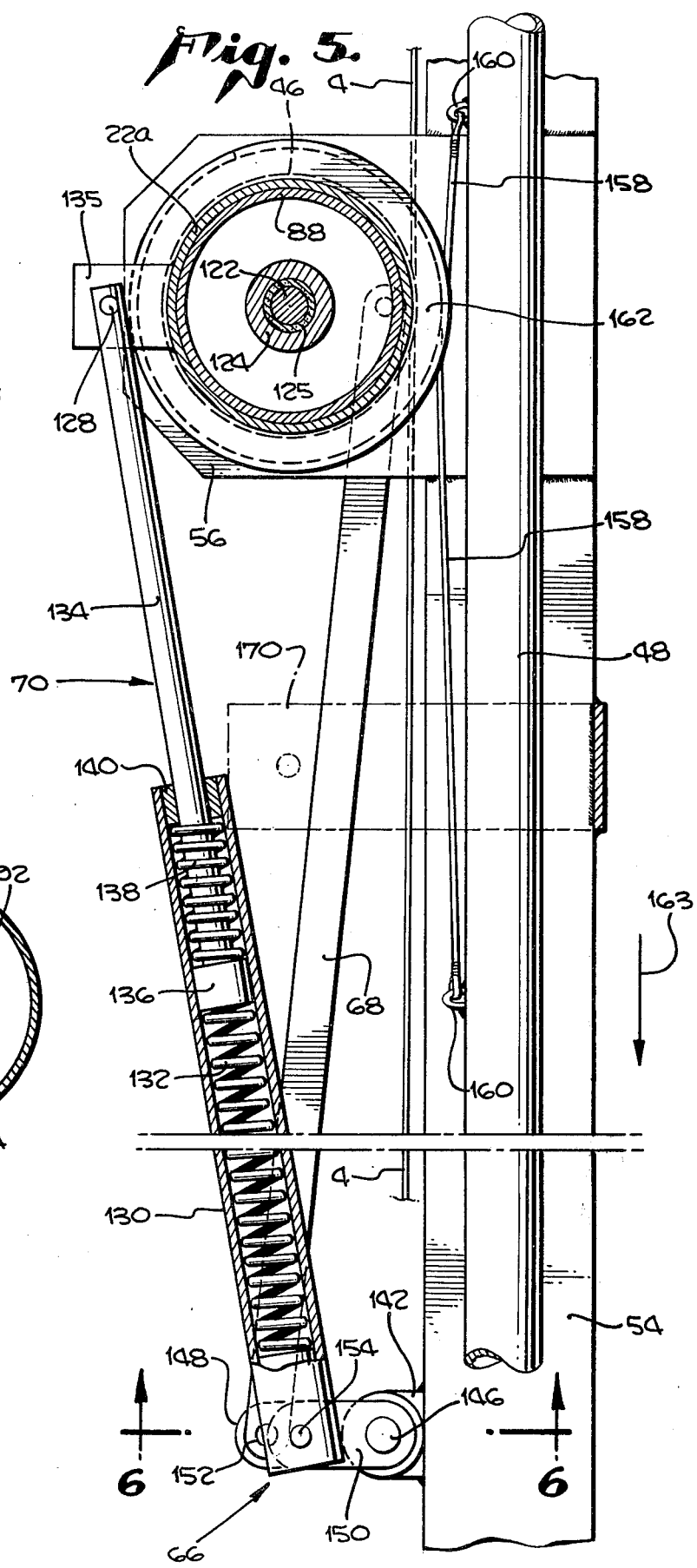

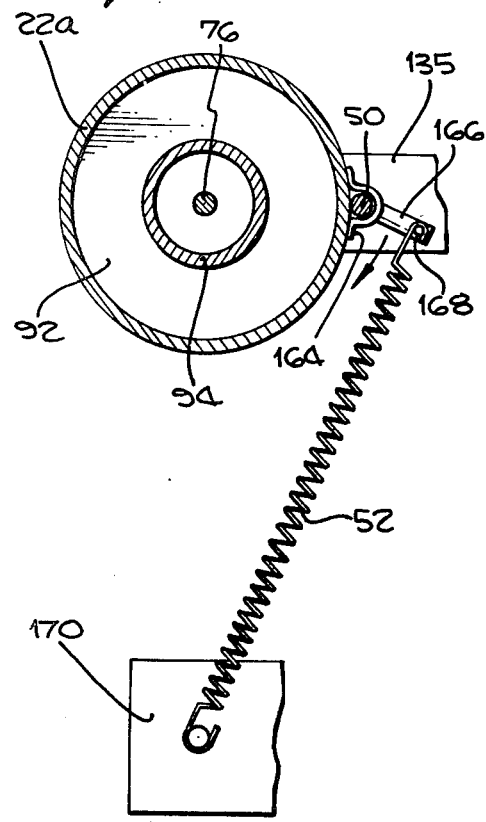
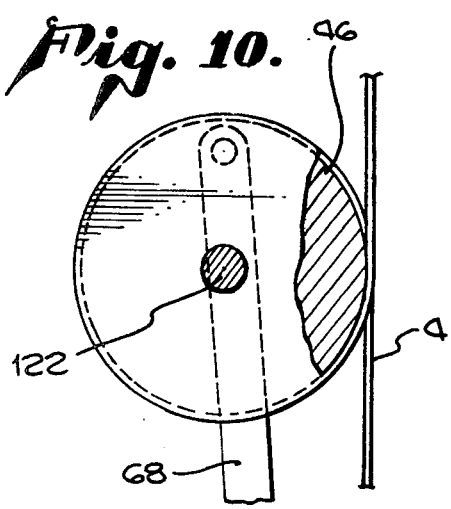
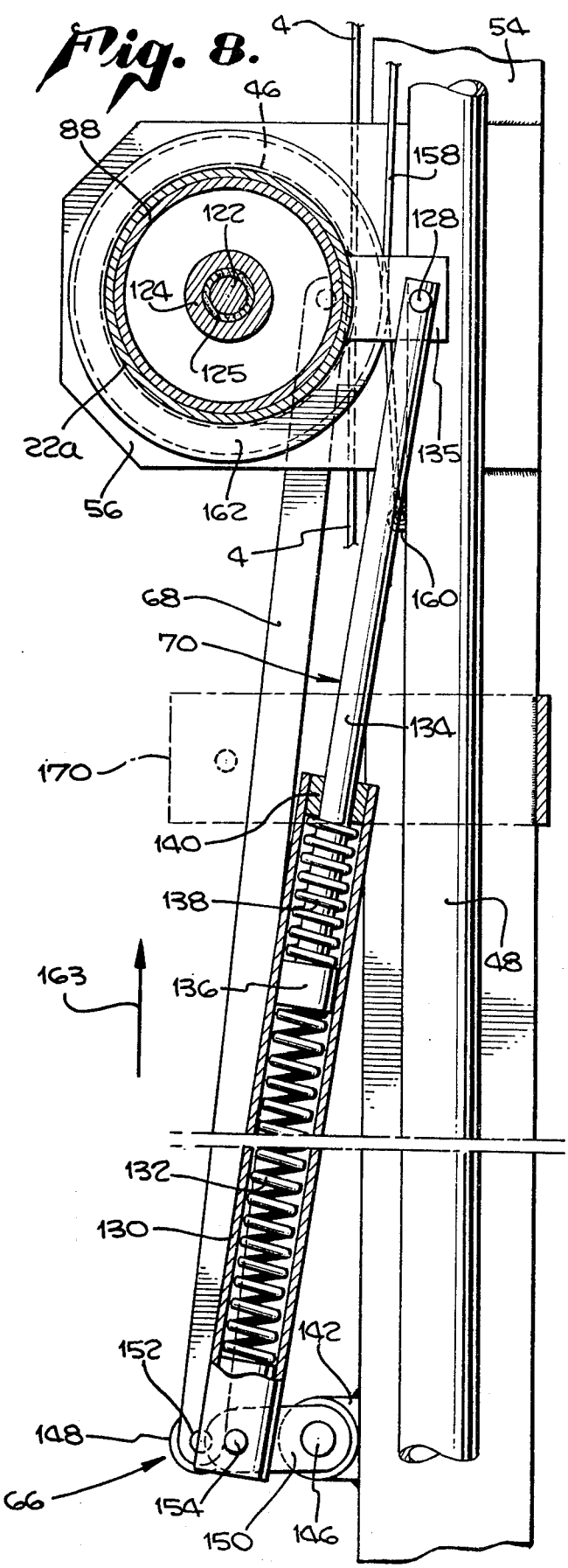

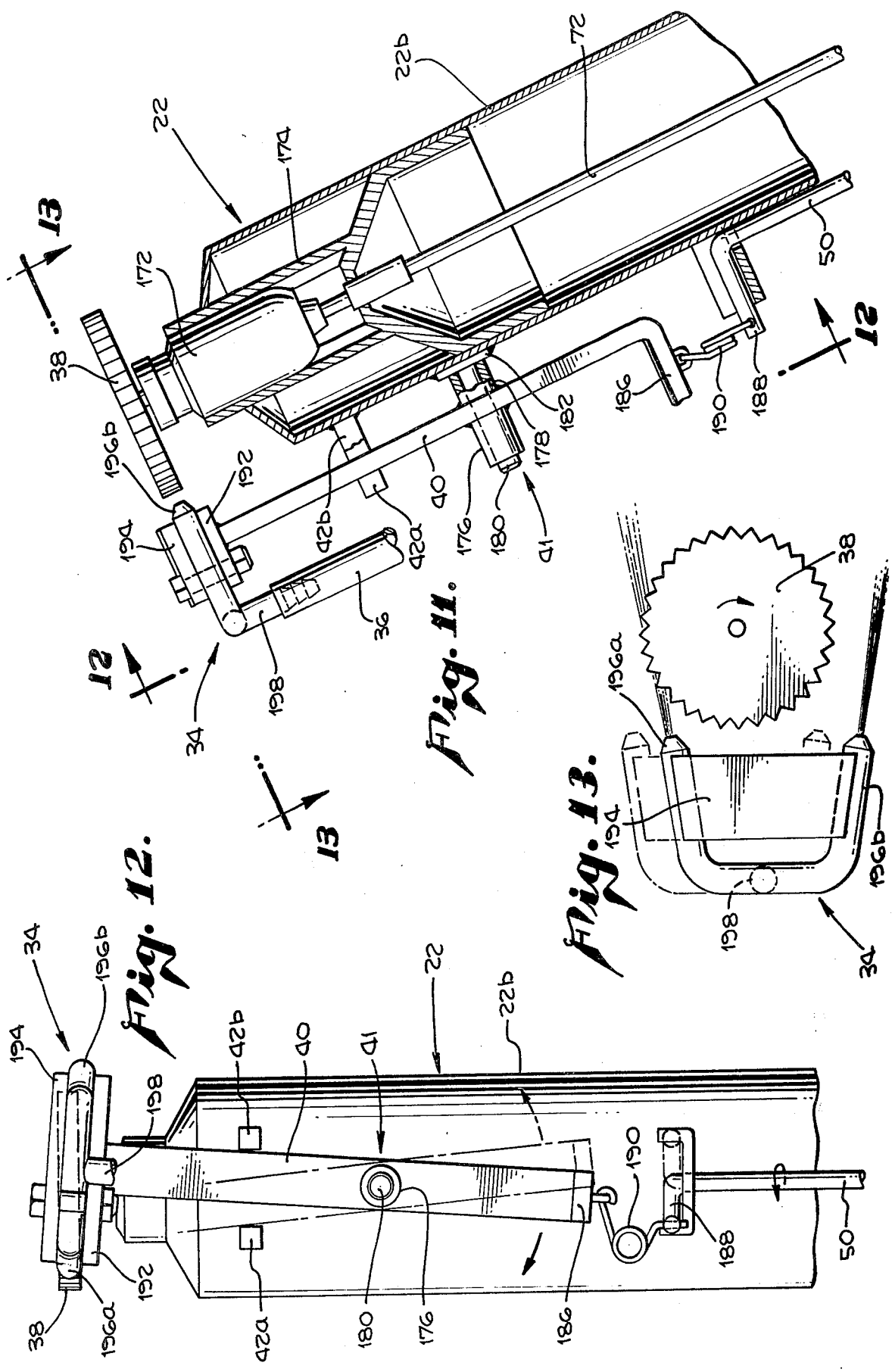

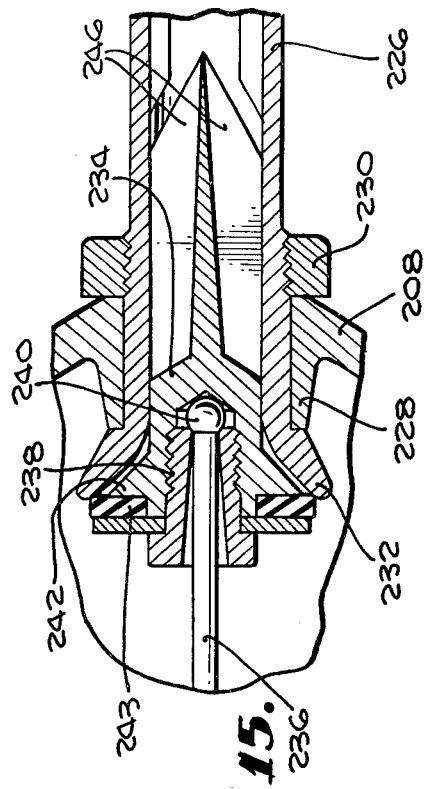
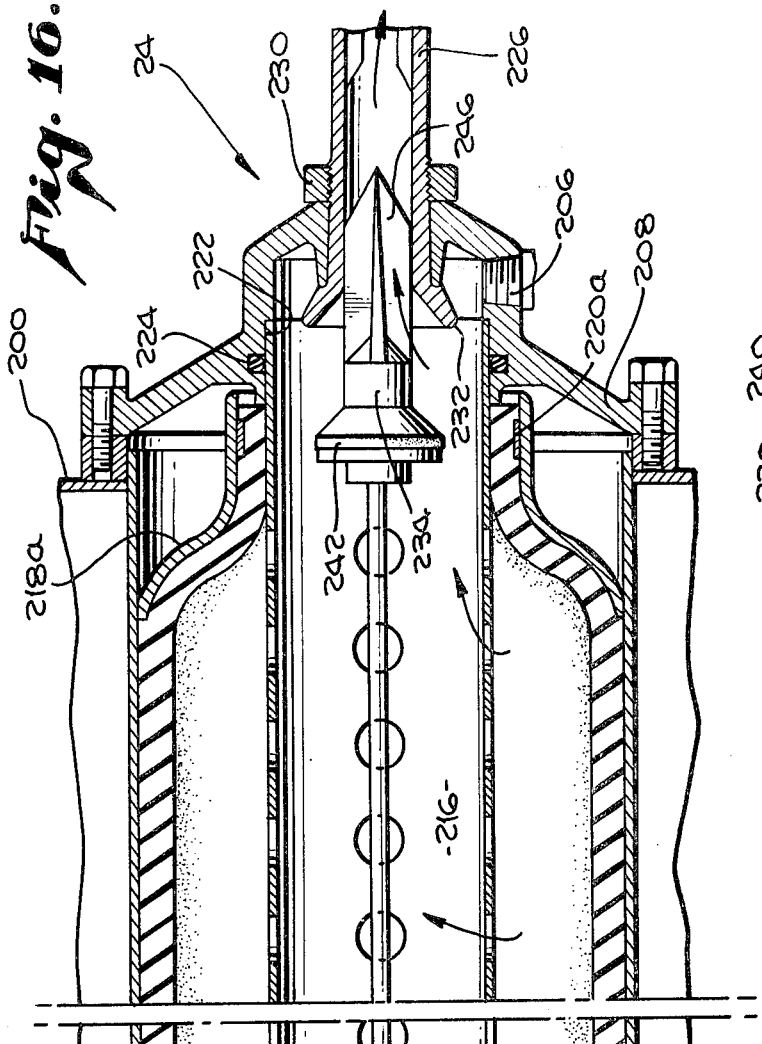
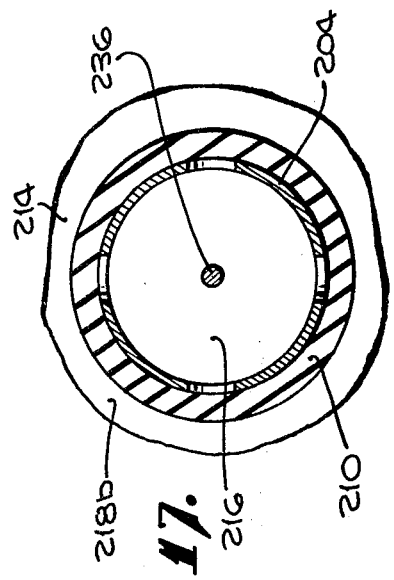

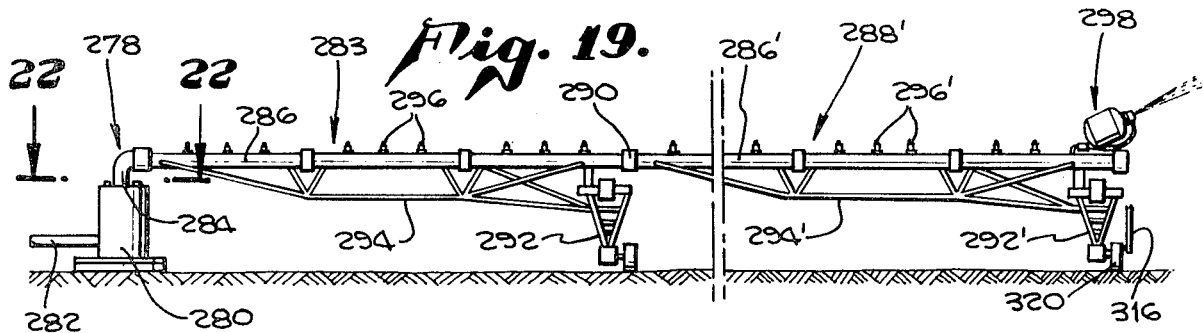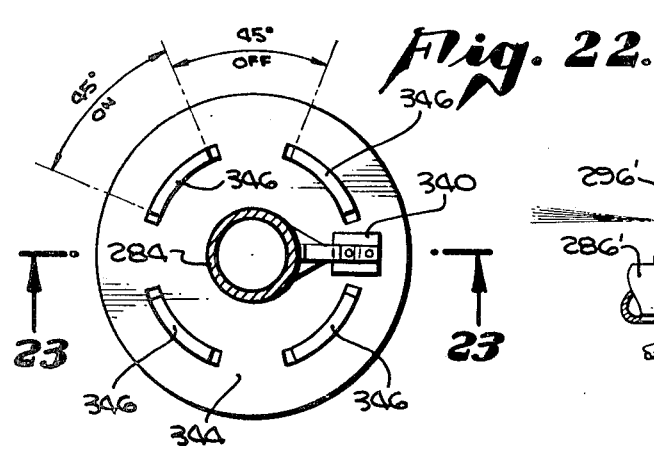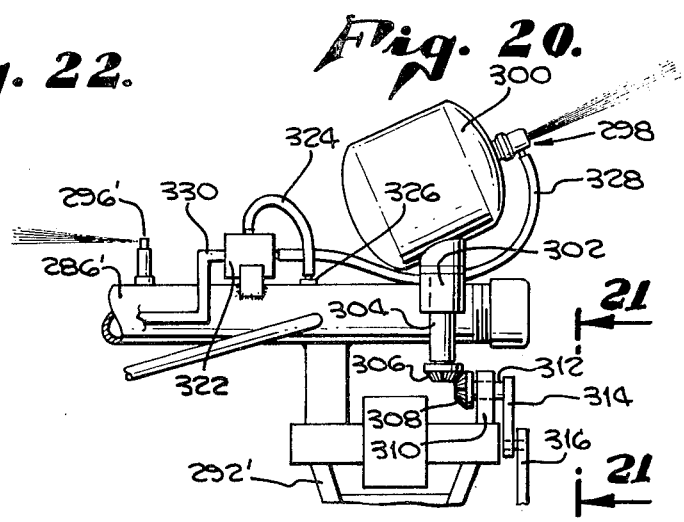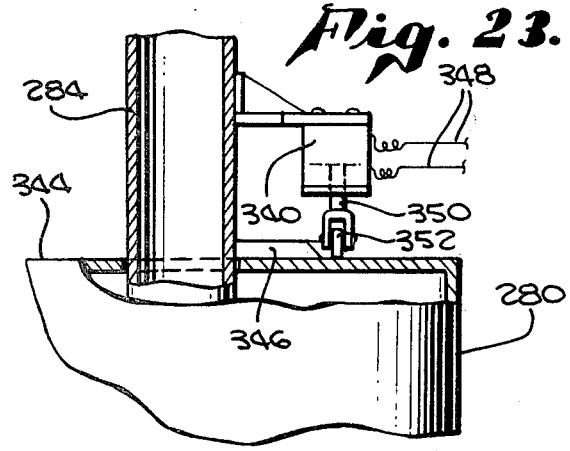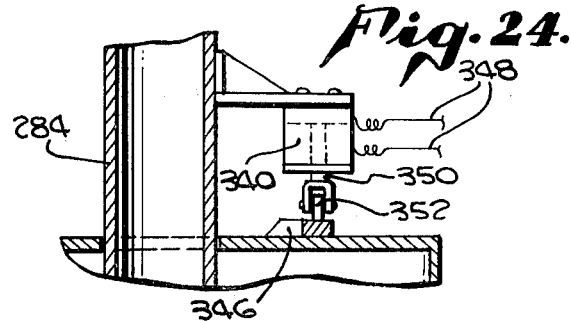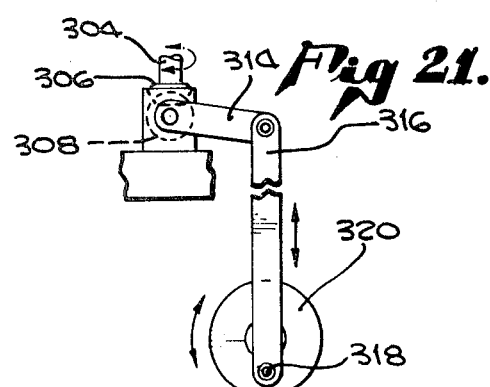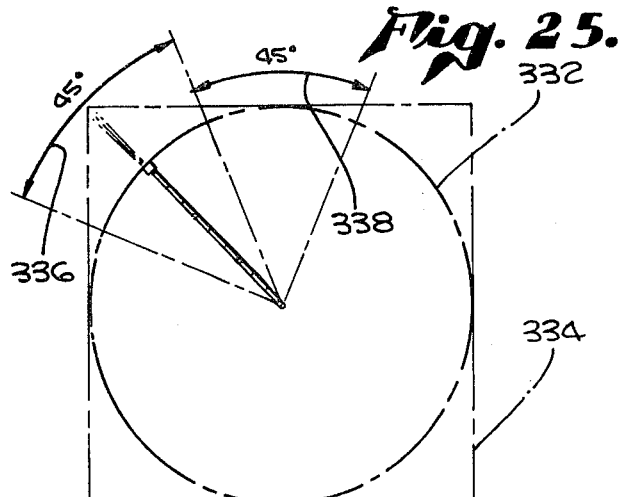

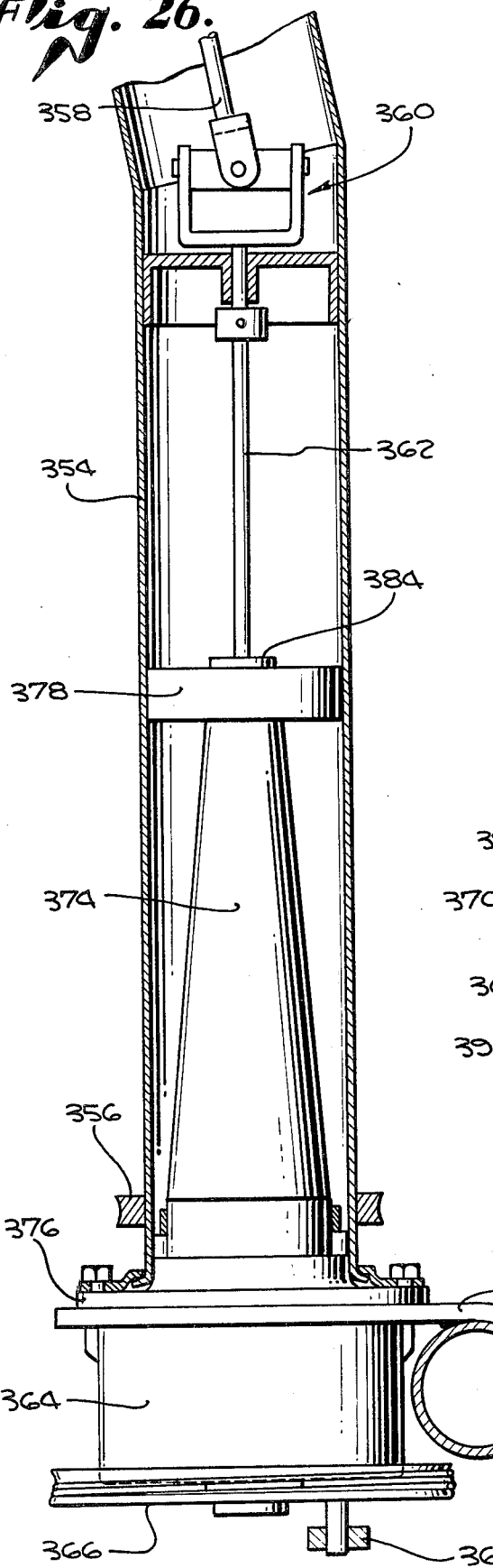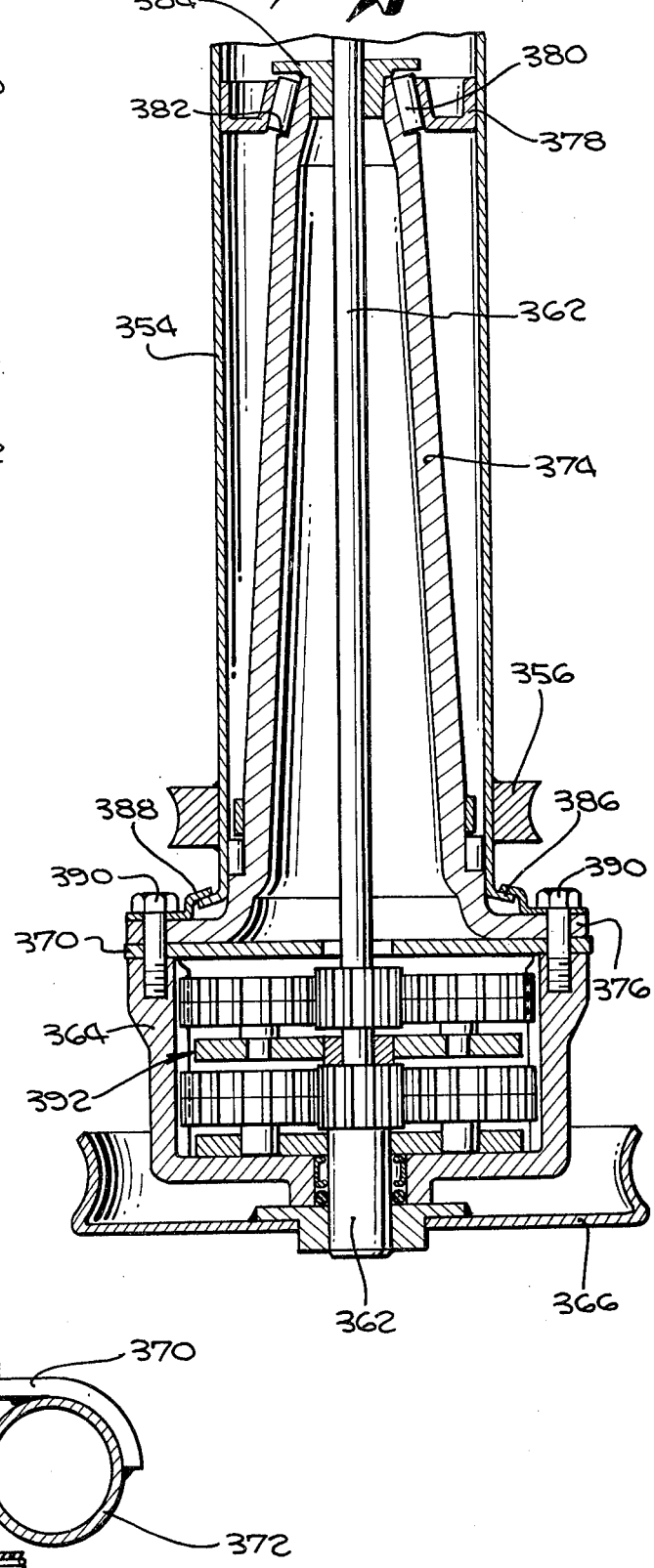

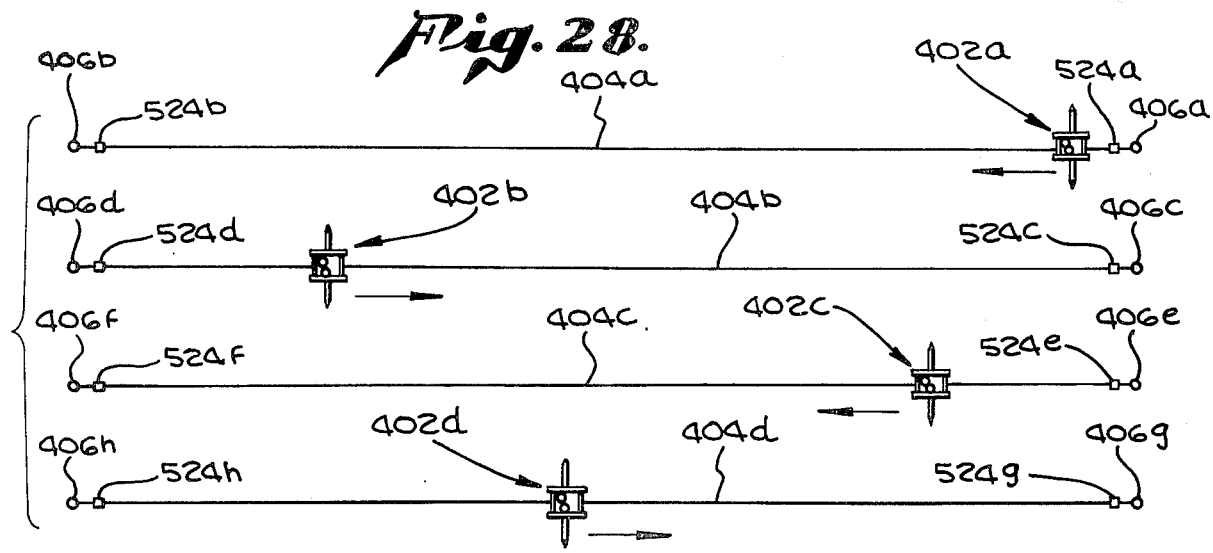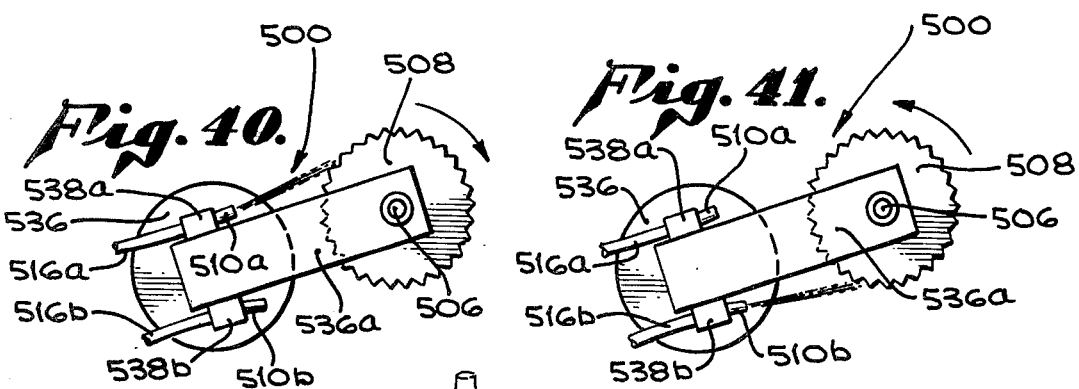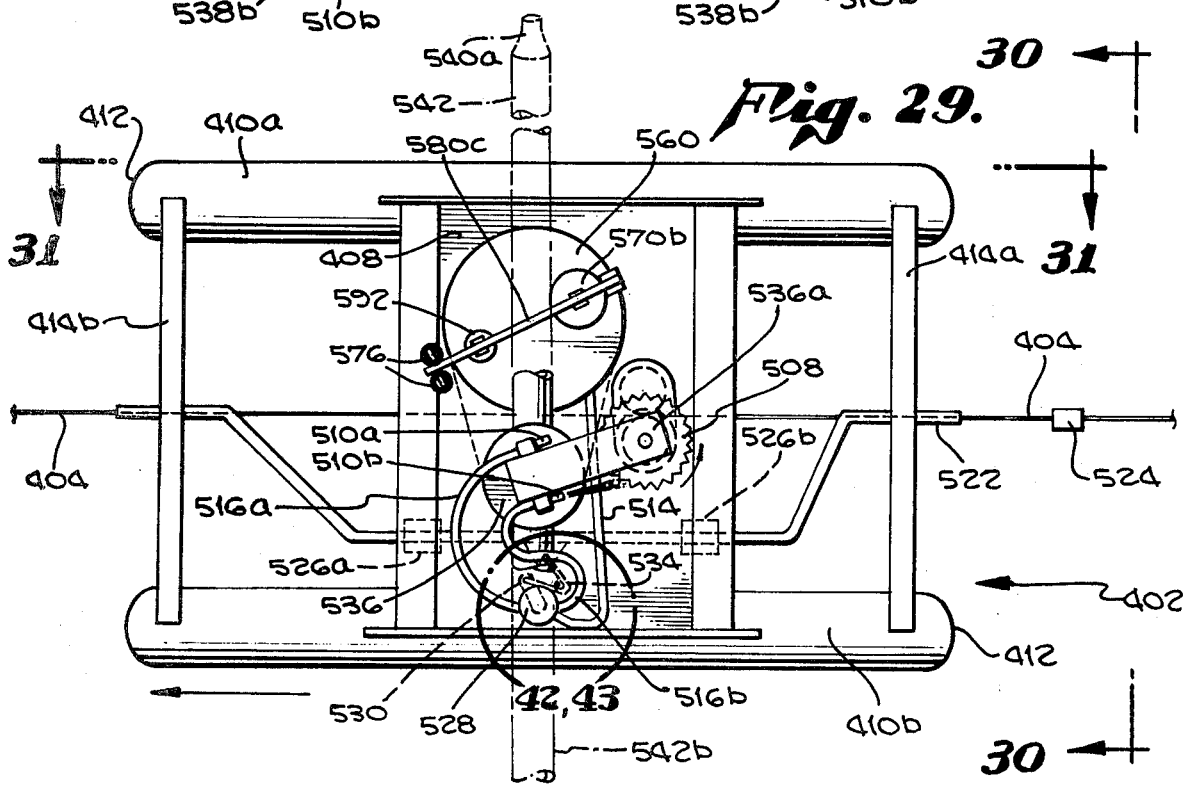

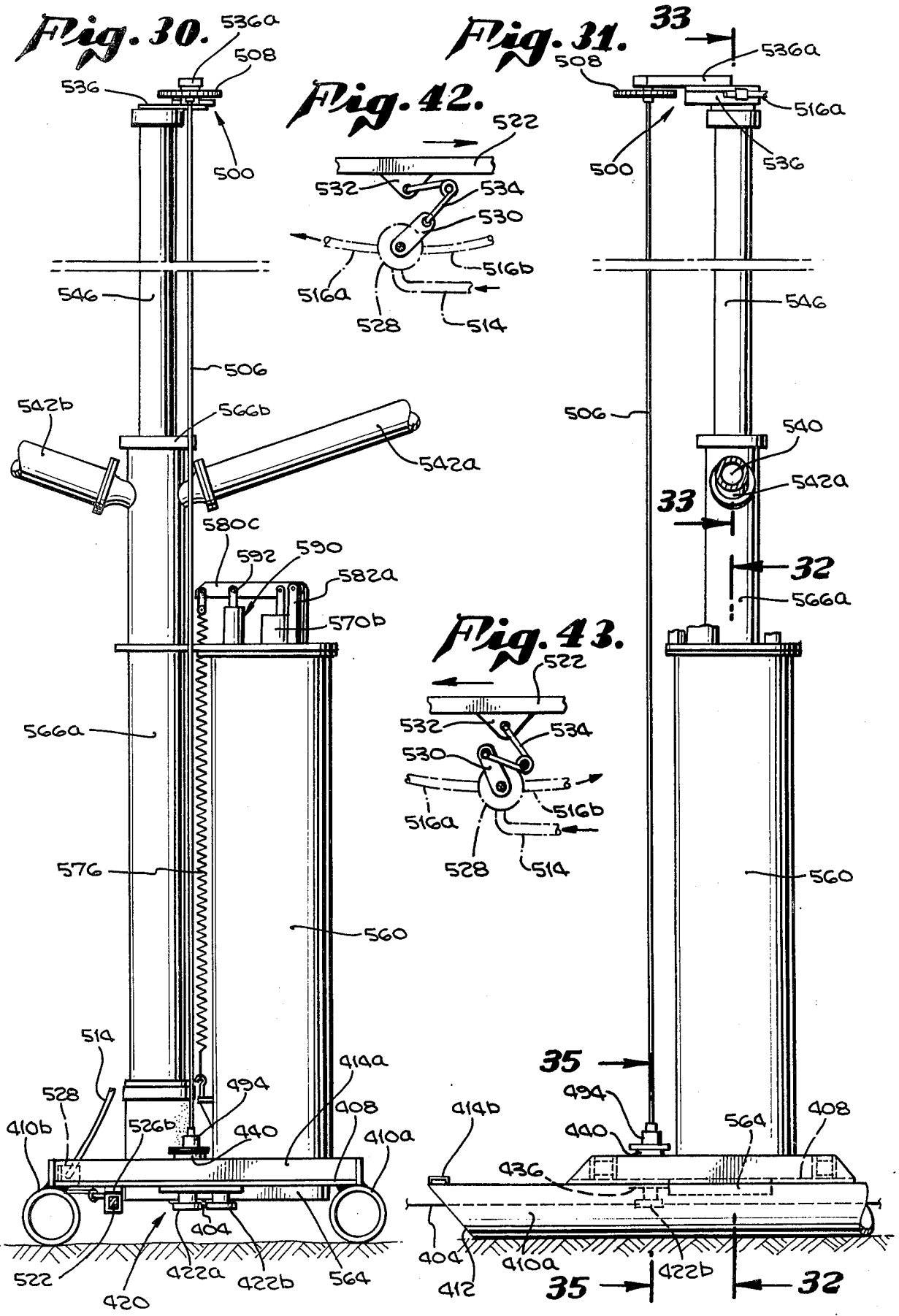

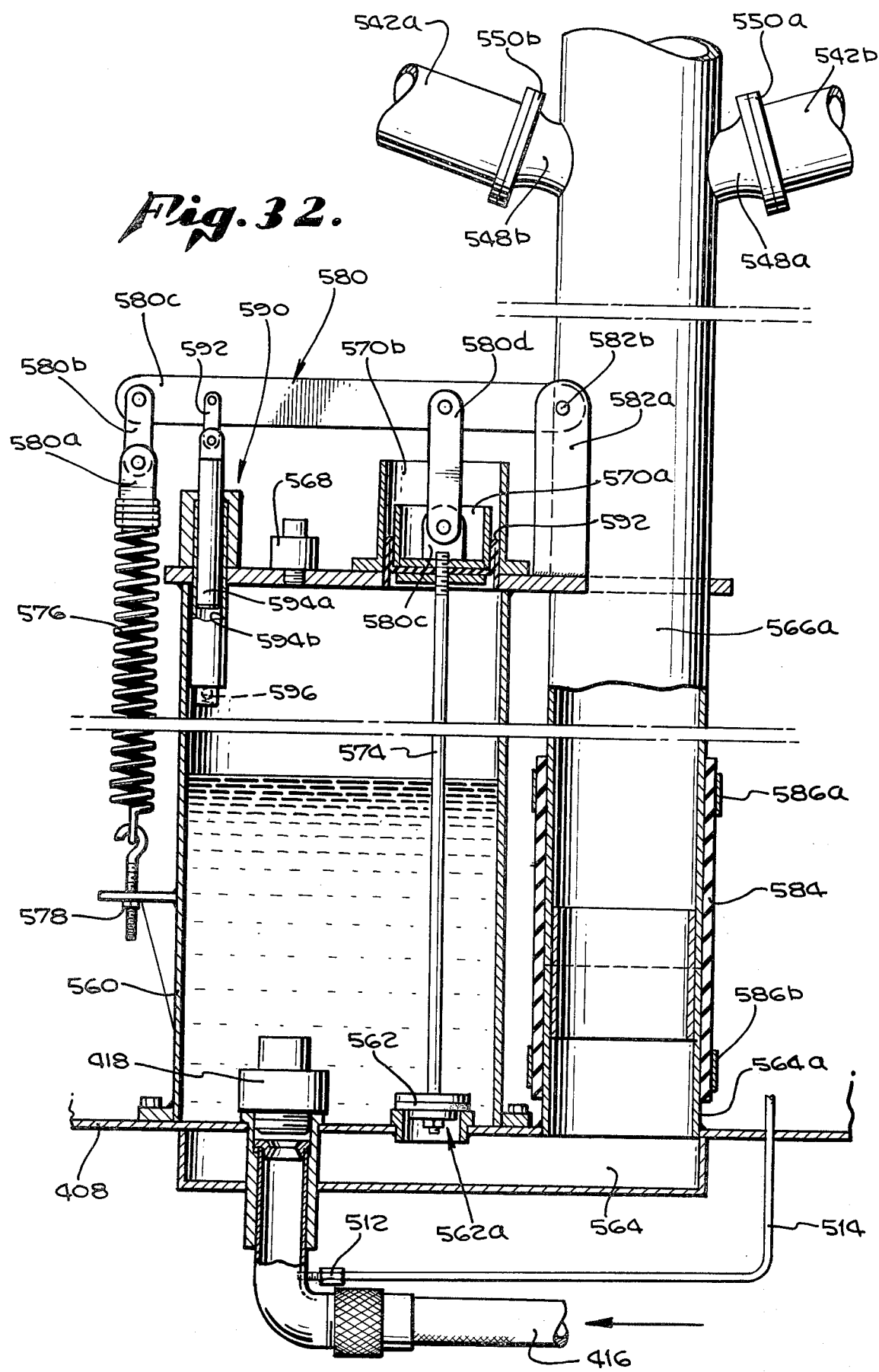

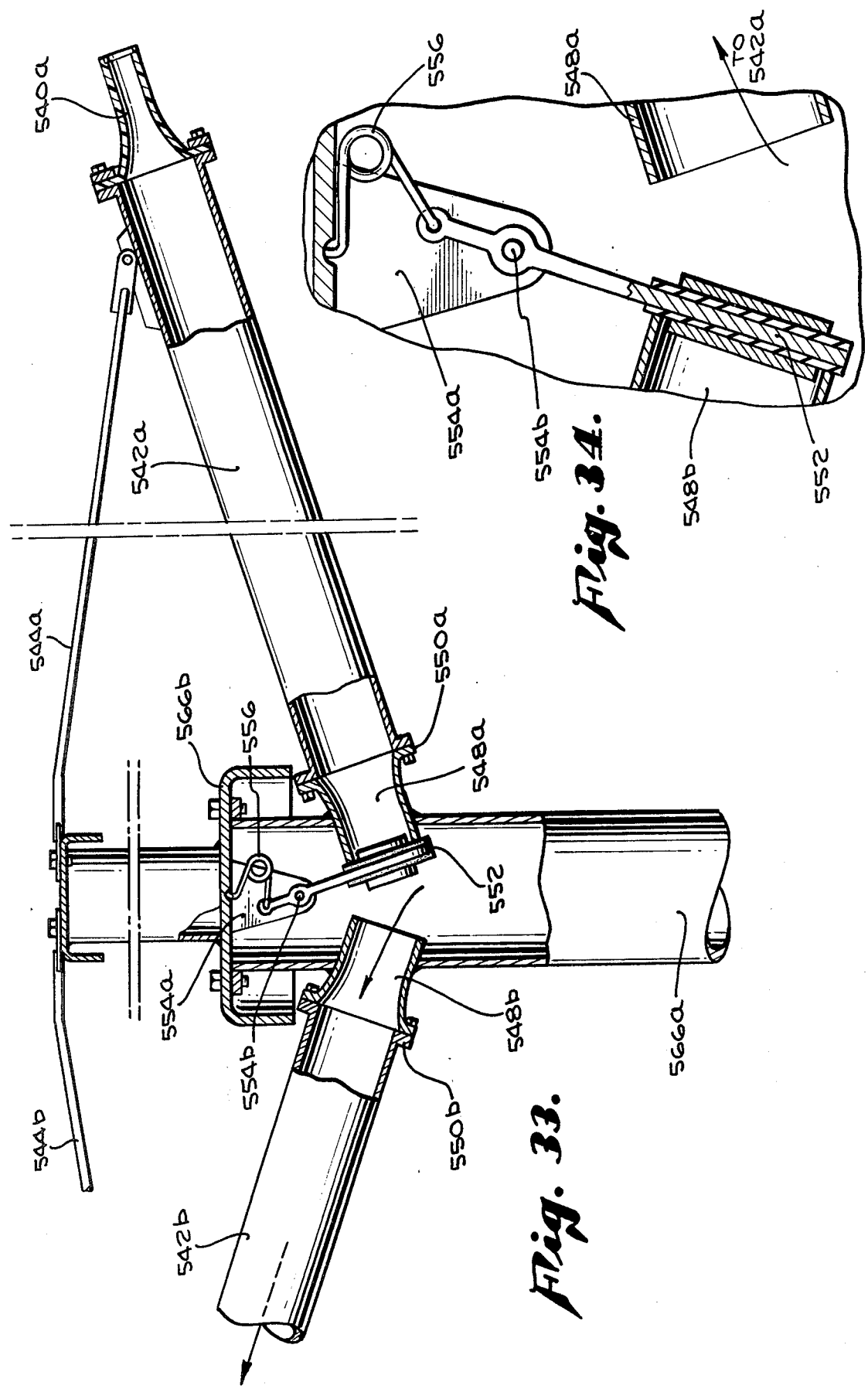

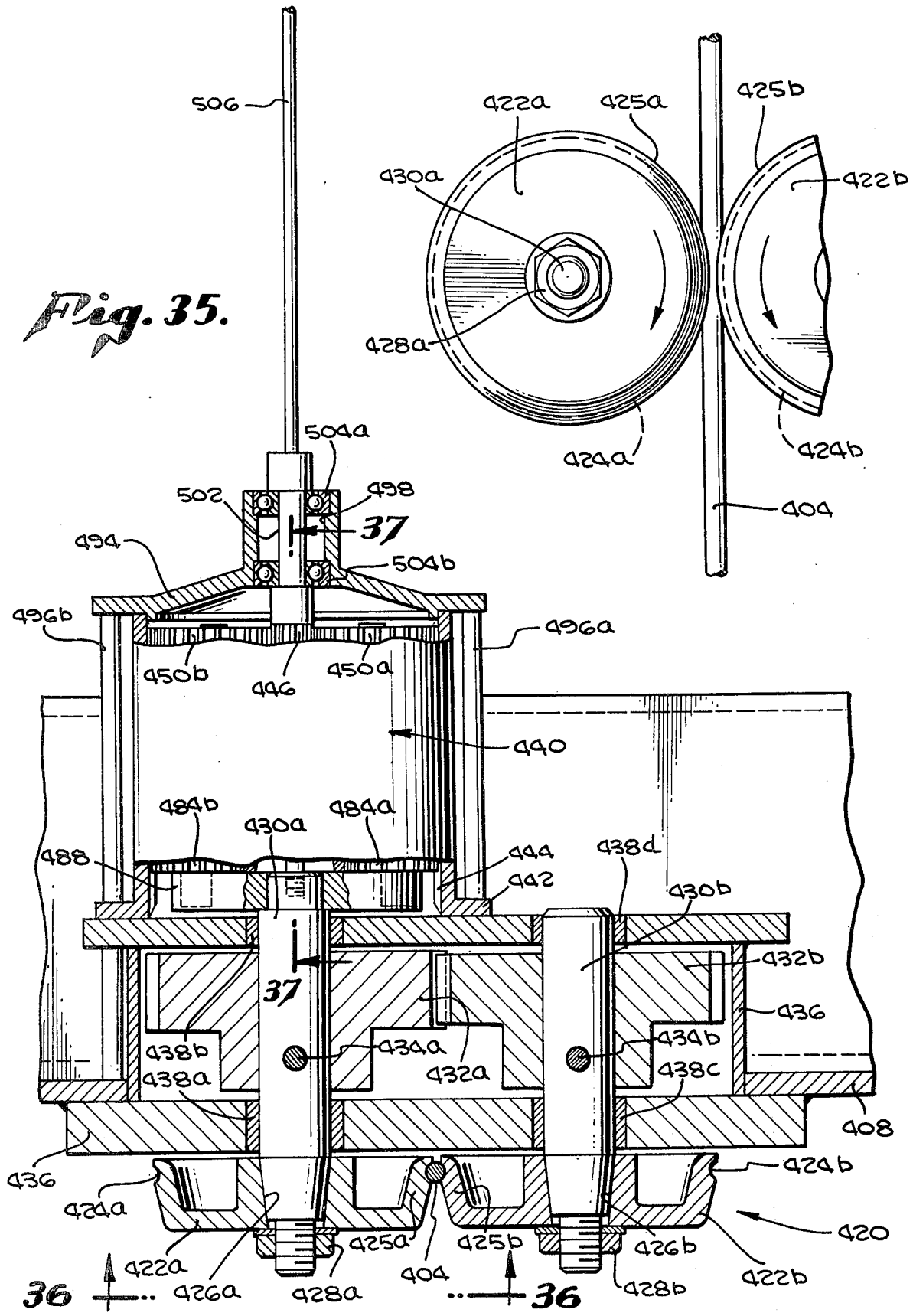

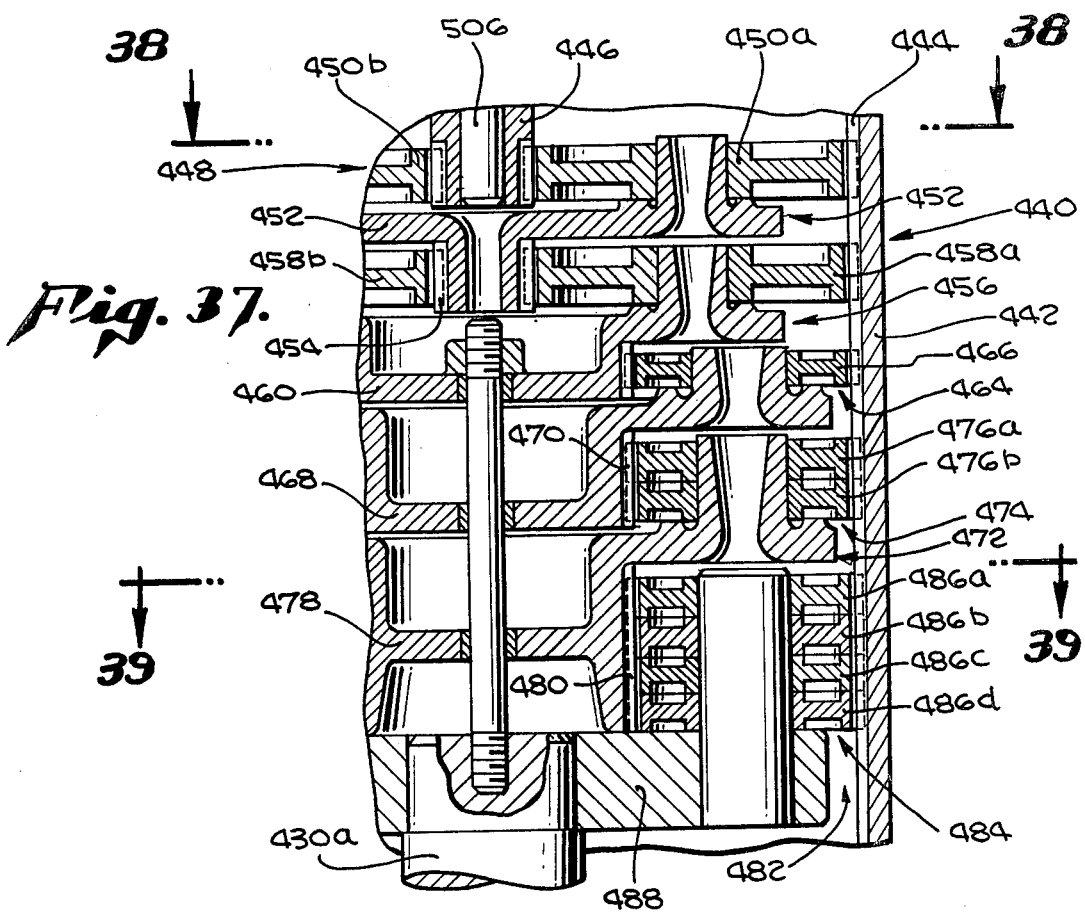
Fig. 37.
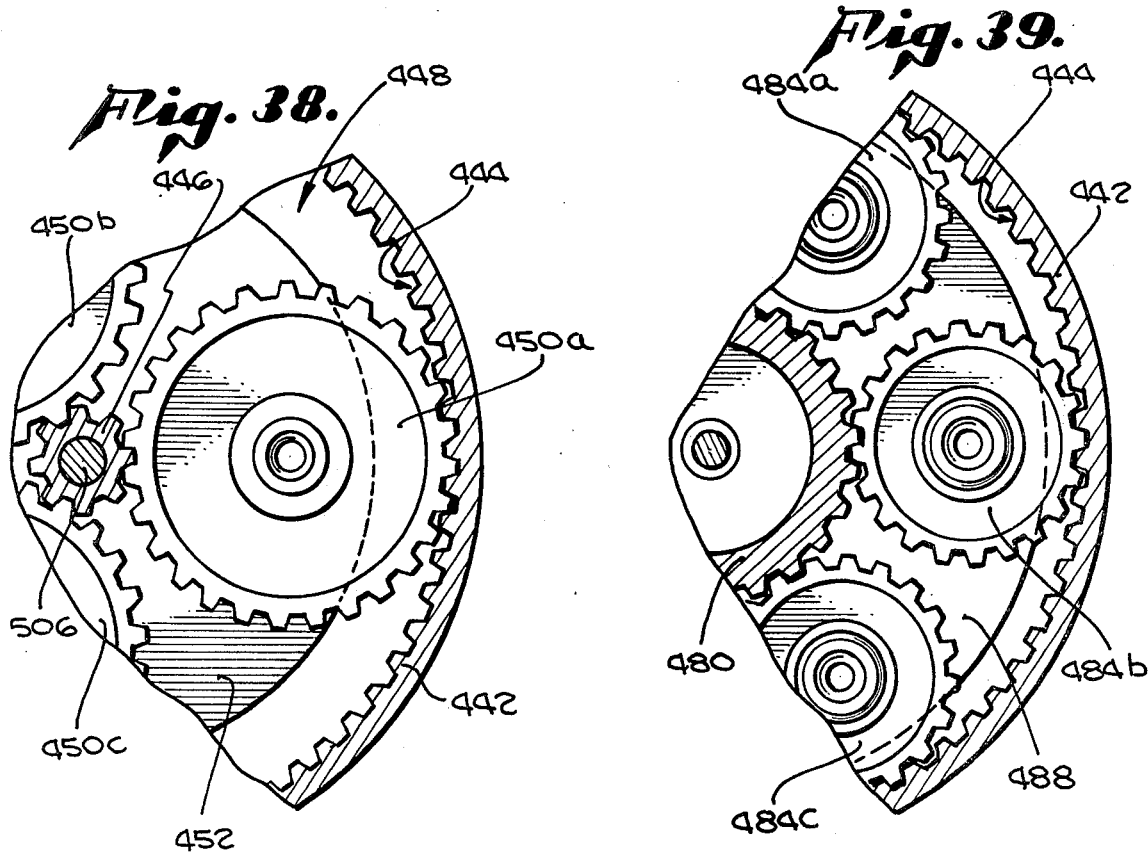
Fig. 38.
Fig. 39.

TRAVELING SPRINKLER SYSTEM AND METHOD

BACKGROUND OF THE INVENTION

The present invention relates in general to methods and sprinkler apparatus for irrigating agricultural fields. More specifically, the present invention relates to traveling sprinklers used to water large fields under agricultural cultivation wherein the sprinkler must traverse fairly large land areas in a continuous and fully automatic manner so as to apply needed water with a minimum of attention from an operator.

A common approach to the problem of irrigating a large area heretofore has been to utilize a self-propelled irrigation system which pivots around a central source of irrigation water and irrigates a generally circular configured area. These center-pivot irrigation systems generally consist of a plurality of individual units aligned in a linear series, each individual unit being provided with propulsion means for rotating about a center pivot. An alignment control device is required to keep the individual units in a linear alignment extending radially outward from the center pivot. These center pivot systems are generally limited to use in very large agricultural fields, which are typically square and at least one-half mile on a side. As water is distributed over a generally circular area, the corners of the agricultural field are often inadequately irrigated.

In addition to the terrain limitations inherent in a center-pivot system, such systems typically require an input water flow volume of at least 500 gallons per minute in order to adequately pressurize a distribution system, which is typically at least one-quarter mile long and which continuously applies water to the field being irrigated. With large quantities of water continually dispensed from the system, water is generally discharged onto the field as fast as it is received in order to avoid unnecessary accumulations which might weigh the system down. In U.S. Pat. No. 3,610,531 to Erickson, for example, linear traveling sprinkler apparatus is shown in which the sprinklers are operated while the system is stopped, energy from the flowing water is stored in a spring, and the stored energy is used to move the sprinkler line only when it is substantially empty.

Also, most center pivot systems are limited in application to use in areas where the nature of the soil permits a high rate of penetration of the irrigation water beneath the surface. This is necessitated by the continuous application of large volumes of water by the system. Additionally, the soil must have high load bearing properties when it is wet in order to support the drive wheels of the irrigation units and provide traction therefor.

Other types of traveling sprinklers have been known heretofore, such as in prior U.S. Pat. No. 1,142,448, which traverse a strip configured portion of a field. This type of sprinkler travels along a cable, sprinkling continuously across the field as it is propelled by means of a cable wind-up reel. They are not designed for large area coverage such as a farm field or golf course, and are generally incapable of providing a relatively low irrigation rate to the area they do cover.

Another approach to solving the problem of irrigating a large area involves the use of an in-ground system in which sprinkler heads are distributed over the field and supplied with water by an underground conduit network. While such systems have been provided with intermittent type sprinklers to reduce the rate at which water is applied, the initial capital and installation costs are high and, unless relatively large amounts of water are required on a fairly regular basis, may be prohibitive.

Certain irrigation applications require a more flexible solution than available heretofore; one which is easily adaptable to smaller, irregularly shaped fields and is less expensive and less complex than the systems used in the large fields. More importantly, there exists a need for a relatively low cost, auxiliary or supplemental type irrigation system for use in localities which generally have adequate rain fall, but which are subject to unusually dry periods when temporary irrigation is required. In such localities the high costs of heretofore available large areas systems may have inhibited the installation of any system at all.

In addition, there are irrigation needs where the type of soil under irrigation will not accept the amount of water which may otherwise be required to operate the sprinkler system. There is accordingly a need for a sprinkler irrigation system adaptable for use in areas where the soil does not allow rapid penetration of water, or is structurally unable to support and provide traction for the drive wheels of the system.

SUMMARY OF THE INVENTION

In view of the above problems associated with the prior art, an object of the present invention is the provision of a novel and improved low cost agricultural sprinkler system and method for use in localities which generally have an adequate rain fall and do not, under normal conditions, require artificial irrigation.

Another object is the provision of a novel and improved sprinkler system capable of providing a relatively low irrigation rate over a large area, for use in agricultural irrigation where the nature of the soil does not permit a high rate of penetration of the irrigation water beneath the surface.

Another object of the present invention is the provision of an improved traveling agricultural sprinkler which is relatively inexpensive to own and operate and which is suitable for use in both small and large agricultural fields having irregular configurations.

A further object of the present invention is the provision of an improvement in means for automatically propelling an agricultural sprinkler back and forth across a strip configured area of a field with a minimum of operator attention in a reliable manner.

Yet another object is the provision of a center-pivot irrigation system with a relatively low cost, supplemental intermittent sprinkler means adapted to substantially increase the area irrigated by said system.

The above objects are satisfied in the present invention by the provision a sprinkler system comprising a mobile base, a water supply sprinkler means mounted on the base for accumulating water from the supply and intermittently discharging a stream of accumulated water, and means for propelling the base across a field to be irrigated, and the method of operating the system. The base is propelled in a back and forth movement and water is discharged generally laterally to the direction of travel, such that a strip of the field is irrigated on each run.

In a preferred embodiment the sprinkler means comprises an accumulator housing with a resiliently expandable bladder which forms a reservoir to receive and accumulate water from the water supply. The bladder expands generally laterally to the discharge direction against an expansion limiting casing as water is accumulated. When a threshold water pressure is reached a pressure responsive diaphragm, which forms part of the reservoir wall, flexes to expose an outlet nozzle through which the accumulated water is discharged under pressure. Contraction of the bladder prolongs the discharge until a second threshold is reached, at which time the diaphragm flexes back to close the nozzle and the bladder rests against a perforated structural substrate.

In one embodiment the sprinkler is propelled along a guide wire extending across the field by means of a drive pulley rotatably mounted on the base and encircled by the guide wire, and means for rotably driving the pulley so that it pulls the base along the wire. The pulley is also used to oscillate the sprinkler as it travels over the field. In another embodiment, a linearly rigid guide rod is extended across the field, and the sprinkler propelled by means of a pair of pinch wheels adjacently mounted on the base and pinching the guide rod therebetween. In either case the drive force is preferably derived from a water wheel, and means are provided for diverting a portion of the water supply and directing it in a jet to rotate the wheel. Water from the jet apparatus is also directed onto the field at a short range relative to the intermittent stream, thereby providing close in irrigation.

Other features include the provision of a shift rod means, which engages a stop positioned on the field as the sprinkler approaches the stop, to reverse both the direction of sprinkler travel and the direction in which water is discharged from the sprinkler.

In another application of the invention, a rotating center-pivot irrigation system is supplemented with a sprinkler means which intermittently discharges an irrigating stream generally outwardly from the center-pivot. With the addition of an appropriate timing control, the area under irrigation may be changed from a circular to a larger area, generally square configuration, thereby substantially reducing the amount of unused land when adjacent fields are irrigated.

A more complete understanding of the present invention, as well as a recognition of additional objects and advantages, may be obtained by those skilled in the art from a consideration of the following detailed description of exemplary embodiments thereof. Reference will be made to the appended sheets of drawings, which will first be briefly described.

DESCRIPTION OF THE DRAWINGS

FIG. 2 is a side elevation view of a mobile agricultural sprinkler constructed in accordance with the invention, showing long distance intermittent spraying structure, a mobile base for supporting and transporting said structure, and a drive system for propelling the base;

FIG. 5 is a sectional view, through the plane 5—5 of FIG. 4, showing a mechanism for reversing the direction of sprinkling when the sprinkler has reached the end of a field, and for oscillating the sprinkler during a traversal;

FIG. 6 is a partially cross-sectional view, through the plane 6—6 of FIG. 5, of a bell crank employed in the sprinkler oscillating structure;

FIG. 7 is a partially cross-sectional view, through the plane of 7—7 of FIG. 4, of part of the structure employed in reversing the direction of sprinkling;

FIGS. 8 and 9 are partially cross-sectional views similar to FIGS. 5 and 7, respectively, showing the sprinkler directional and oscillating mechanisms in a second position;

FIG. 10 is a partially cut-away view, through the plane 10—10 of FIG. 4, showing a pulley employed in the drive mechanism;

FIG. 11 is a cross-sectional view showing the actuating mechanism for the sprinkler drive system;

FIG. 12 is an elevation view, through the plane 12—12 of FIG. 11 showing portions of the control apparatus used in reversing the direction of sprinkler travel;

FIG. 13 is a plan view, through the plane 13—13 of FIG. 11, showing alternate positions of water drive apparatus which also provides near and intermediate distance constant sprinkling;

FIG. 15 is a sectional view, through the plane 15—15 of FIG. 14, of the nozzle portion of the spraying apparatus shown in FIG. 14;

FIG. 16 is a sectional view similar to FIG. 14, showing the intermittent sprinkling apparatus at a second stage of the sprinkling cycle;

FIG. 17 is a sectional view, through the plane 17—17 of FIG. 14, of the expandable water containment apparatus employed in the intermittent sprinkler;

FIG. 19 is an elevation view of another embodiment of the invention in which a rotary irrigation system is supplemented by an intermittent sprinkler;

FIG. 20 is a more detailed elevation view of the intermittent sprinkler shown in FIG. 19, and of its engagement with the remainder of the irrigation system;

FIG. 21 is an elevation view, through the plane 21—21 of FIG. 20, showing means for actuating an oscillating mechanism for the intermittent sprinkler;

FIG. 22 is a plan view, through the plane 22—22 of FIG. 19, of electrical control apparatus associated with the intermittent sprinkler of FIG. 19;

FIG. 23 is a sectional view, through the plane 23—23 of FIG. 22, showing the control apparatus at a first position in the sprinkling cycle;

FIG. 24 is a sectional view similar to FIG. 23 showing the control apparatus at a second state of the sprinkling cycle;

FIG. 25 is a plan view of a field showing an irrigation pattern achievable with the system of FIG. 19;

FIG. 26 is a partially sectional view showing the general layout of the drive mechanism for another embodiment of a self-propelled intermittent sprinkler;

FIG. 27 is a sectional view showing portions of the drive mechanism of FIG. 26 in greater detail;

FIG. 28 is a plan view of another embodiment of the invention, showing an agricultural field with a plurality of agricultural sprinklers each adapted to irrigate a strip configured area of the field intermittently and on alternate sides of a general direction of travel of the sprinkler as it traverses the field;

FIG. 29 is a plan view of an individual agricultural sprinkler from FIG. 28, mounted on a sled-like base.

FIG. 30 is a view, through the plane 30—30 of FIG. 29, showing means for propelling the sprinkler across a field and the general spatial relationship between the components of the water distribution system including the water accumulator tank, the riser conduit, and the spray nozzle supply conduits;

FIG. 31 is a view, through the plane 31—31 of FIG. 29, showing the relative arrangement of propulsion elements and water supply elements, as well as the configuration of the tip portion of the runners which support the base.

FIG. 32 is a sectional view, through the plane 32—32 of FIG. 31, showing in detail the operational relationship between the water accumulator tank, intermittent water supply valve, outlet chamber, riser conduit, and spray nozzle supply conduits;

FIG. 33 is a partial sectional view, through the plane 33—33 of FIG. 31, showing in detail the relationship between the riser conduit, selector valve, spray nozzle supply conduits and water spraying nozzles.

FIG. 34 is a detail view of the selector valve assembly;

FIG. 35 is a sectional view, through the plane 35—35 of FIG. 31, showing in detail the propulsion means for propelling the agricultural sprinkler across a field and its associated speed reducing transmission;

FIG. 36 is a plan view showing the operational inter-relationship between the linear rigid guide rod and the pinch wheels;

FIG. 37 is a partial sectional view, through the plane 37—37 of FIG. 35, showing details of the internal structure of an exemplary transmission which utilizes planetary speed reducing gears;

FIG. 38 is a detail view, through the plane 38—38 of FIG. 37, showing the inter-relationship between an input drive gear and an initial planetary gear assembly;

FIG. 39 is a detail view, through the plane 39—39 of FIG. 37, showing the relationship between a terminal planetary gear assembly which is rigidly attached to an output drive shaft, and the sun gear of an immediately preceding planetary gear assembly which drives the terminal planetary gear assembly;

FIGS. 40 and 41 are plan views of a water powered drive means for actuating the sprinkler drive system; and FIGS. 42 and 43 are elevation views of a control for the water powered drive actuator.

DETAILED DESCRIPTION OF PREFERRED EMBODIMENTS

Figure 1:
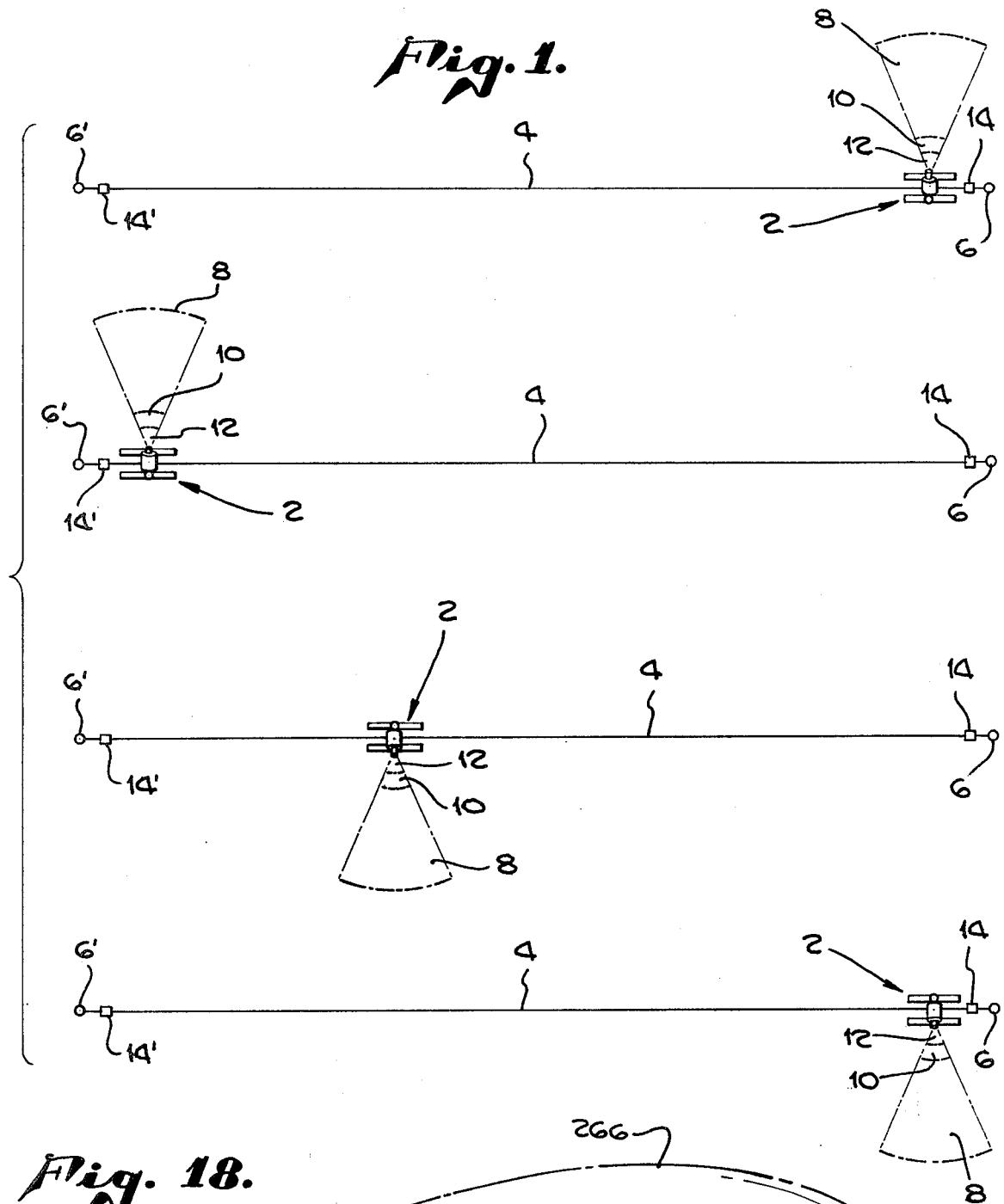
FIG. 1 is a plan view illustrating an agricultural field being irrigated by four mobile sprinklers in accordance with the invention.

An agricultural sprinkler system incorporating the present invention is shown in FIG. 1. A plurality of individual agricultural sprinklers 2, are shown, each being adapted to traverse a field and to irrigate a strip configured area thereof. The term "field" is used herein in a general sense, and includes crop fields, pasturage, large open areas such as golf courses and parks, and the like. The term "agricultural" is used in an equally broad sense. Each sprinkler is propelled along a guide wire 4 which extends across a portion of the field between guide wire anchors 6 and $6^1$. While the figure shows four separate sprinklers covering an entire field, their mobile capability would also permit irrigation with but a single sprinkler which is moved sequentially from one guide wire to the next after irrigating the portion of the field associated with each wire. This flexibility enables a trade-off to be achieved between capital cost and the time required to irrigate a field, the cost decreasing but the required time increasing as the total number of sprinklers is reduced.

Details of the spray pattern achieved with the exemplary embodiment depicted are provided hereinafter, but it should be noted at this point that in the preferred embodiment three zones of spraying are achieved. A first, long distance zone 8 is irrigated with an intermittent spraying pattern in which relatively high volume bursts of water are delivered at time-spaced intervals, such that a large area coverage is achieved with a relatively low amount of water expended per unit of area. An intermediate zone 10 is irrigated with a continual stream of water which is emitted from the sprinkler at a considerably lesser volumetric rate than the intermittent bursts. However, because its area is less than that of the long distance zone and the spraying is continual, the amount of water delivered to the intermediate zone per unit area may be similar to that for the long distance zone. A short distance zone 12 is also irrigated by a continual stream of water which is emitted from a sprinkler at the same volumetric rate as for the intermediate zone, but which is deflected to cover the zone closest to the sprinkler. In practice there is considerable overlap between the three irrigation zones, but the bulk of the water delivered falls into the pattern described above.

The traveling sprinklers traverse the field along their associated guide wires between opposed stop posts 14, $14^1$, and are shown at four different points of the sprinkling cycle. Appropriate flexible water conduits, not shown in FIG. 1, are provided to supply each sprinkler with irrigation water. The topmost sprinkler is shown at the beginning of a right-to-left traverse, spraying to the right with respect to its direction of travel. In the preferred mode of operation it continues moving until it reaches the position of the second sprinkler, which is shown at the opposite end of the field, having just contacted its respective stop $14^1$. At this point water is still spraying in the same direction as during the preceding traversal of the field. The next sprinkler is at a later stage in the sprinkling cycle, having reversed both its direction of travel and its direction of sprinkling as a result of engaging its stop $14^1$. The bottom sprinkler is depicted at the end of a return traverse at the first contact stop 14, and is still sprinkling in the same direction as during the preceding left-to-right traverse. Further movement of this sprinkler into its associated right hand stop 14 reverses both its direction of travel and its direction of sprinkling, causing it to assume the state of the top sprinkler.

By traversing back and forth across the field and sprinkling in first one direction and then the opposite direction in so doing, each sprinkler irrigates a large area with a roughly uniform amount of water, while keeping the capital equipment requirements low. The area coverage is enhanced by the intermittent sprinkling device, which enables the achievement of long distance irrigation over a wide area without using more water than is necessary or desired.

Referring now to FIG. 2, the principal operating sections of a sprinkler constructed in accordance with the present invention are shown. The general features of the sprinkler apparatus will be discussed in connection with FIG. 2, with the details of the various components disclosed in subsequent figures. A water accumulator tank or housing 18 is mounted via welded brackets 20a and 20b to a tubular support pedestal generally indicated by reference numeral 22, the lower portion 22a of which is vertically disposed and the upper portion 22b of which is tilted at an angle such that the weight of the water in housing 18 is generally centered over lower portion 22a. Irrigating water is supplied through a conduit 24 to tank 18, which accumulates the water and intermittently emits a long distance stream or spray 26 through nozzle 28.

The support pedestal and accumulator tank are mounted on a base 30, which includes a pair of ground contacting runners 32a and 32b. The runners are preferably provided with forward and rear tip portions having generally upward sloping lower surfaces which allow them to traverse uneven terrain with a minimum amount of resistance.

A combined actuator for providing both a driving force to propel the sprinkler, and intermediate/short distance irrigation is provided at the top of pedestal 22. A jet forming orifice means 34 is supplied with pressurized water by a branch 36 of conduit 24. Orifice means 34 includes a pair of spaced orifices, both of which emit continual jets of water. A water turbine wheel 38, otherwise known as a Pelton wheel, is rotatably mounted at the top of upper support pedestal portion 22b in the path of one or the other of the jets emitted by orifice means 34. The orientation of the jet orifices is controlled by a partially rotatable support rod 40, pivotally mounted to the pedestal by a pivot pin 41 and rotationally constrained between a pair of spaced stops 42 on the pedestal.

Mounting and position control apparatus for pedestal 22 is carried on base 30 and generally indicated by reference numeral 44. This apparatus includes as its principle components a drive pulley 46 carried below pedestal 22 and coupled internally through the pedestal with turbine wheel 38 to propel the sprinkler across a field, a shift rod 48 which engages one of the rod stops 14 at each end of the field to reverse the direction of sprinkling, and means for reversing the direction of sprinkler travel. The last mentioned means includes a control rod 50 which is rotatably supported adjacent pedestal 22 and, together with a spring 52, couples jet support rod 40 with the base mounting mechanism. A structural beam 54 of generally square cross-section is mounted on the upper side of base 30, with a support plate 56 which actually carries the mounting for pedestal 22 rigidly attached to the beam. A conduit carrying member 58 also extends upwardly from plate 56 to support water supply conduit 26.

Figure 3:
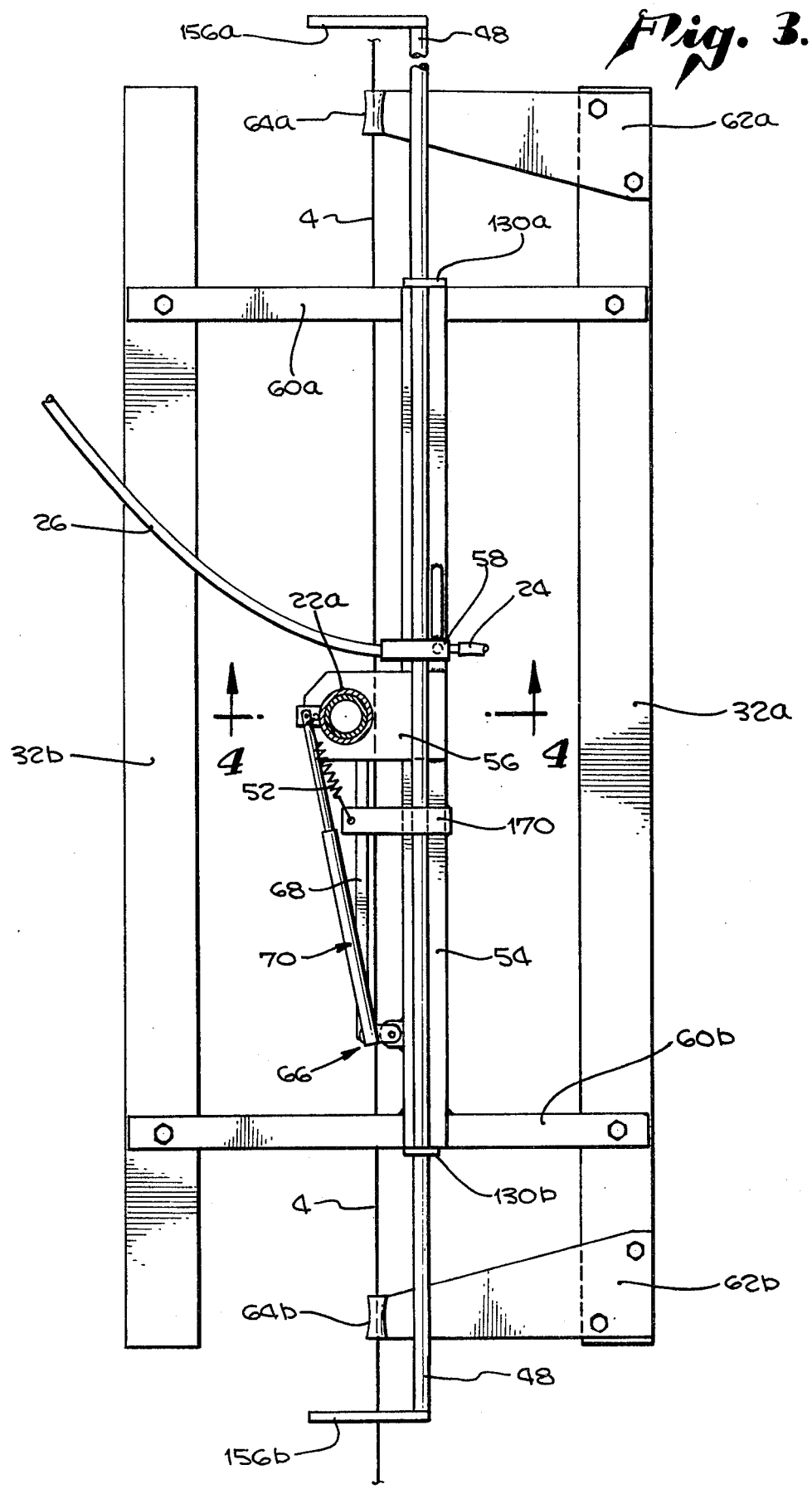
FIG. 3 is a plan view, through the plane 3—3 of FIG. 2, of a sled-like base for the sprinkler.

Referring now to FIG. 3, further details of the base are seen. Span members 60a and 60b are bolted between runners 32a and 32b to retain the runners in a generally parallel spaced relationship, and to provide support for beam 54. A pair of cantilever brackets 62a and 62b are bolted to the opposite ends of runner 32a and extend inwardly parallel to the base plane, terminating near the center of the base with generally cylindrical eyes 64a and 64b through which guide wire 4 extends. Upstanding, apertured mounting members 65a and 65b are carried respectively on span members 60a and 60b, with shift rod 48 captured within the apertures and limited thereby to an axial translation movement. The base structure further includes means for oscillating the sprinkler as the field is traversed, said means comprising a bell crank 66 affixed to beam 54, a first link 68 connected between one end of the bell crank and the underside of drive pulley 46, and a spring biased telescoping link 70 connected between the other end of the bell crank and sprinkler support pedestal 22.

Figure 4:
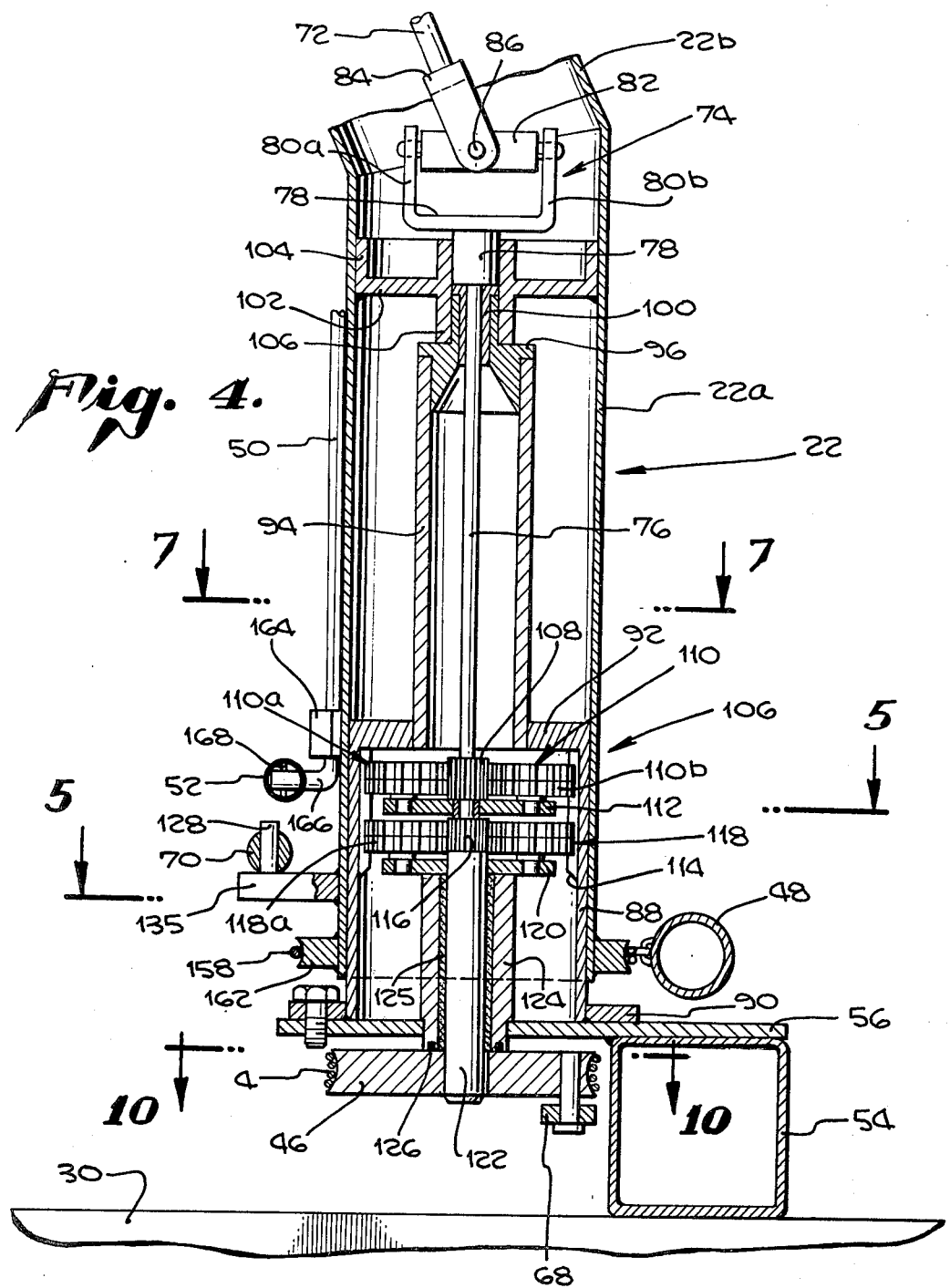
FIG. 4 is a sectional view, through the plane 4—4 of FIG. 3, showing details of the base drive system.

A more detailed view of the sprinkler drive mechanism is provided in FIG. 4. In this figure it is seen that support pedestal 22 comprises a hollow tube which houses major portions of the drive apparatus. An upper drive shaft 72 is coupled by a gear mechanism to water turbine wheel 38 at its upper end, and is rotated about its axis in response to rotation of the water wheel. Shaft 72 is connected through a universal joint, generally indicated by reference numeral 74, to a lower drive rod 76 which imparts a rotary drive motion to drive pulley 46 through a transmission system at its lower end. Universal joint 74 comprises a yoke 78 having a pair of upstanding arms 80a and 80b, each of which is slotted and retains a respective end of a crossbar 42 within its slot. Upper drive shaft 72 terminates in a forked clip 84 which is coupled to the center of crossbar 82 by a pivot connection 86 such that axial rotation of upper drive shaft 72 is translated through universal joint 74 to a similar axial rotation of lower drive shaft 76.

Support pedestal 22 is carried on mounting plate 56 by means of an inner housing 88, which extends upwardly from plate 56 and is secured thereto by welding, and an annular flange 90 which is bolted to plate 56. The outer diameter of housing 88 is slightly less than the inner diameter of pedestal 22, permitting the pedestal to be positioned co-axially over the housing and rotated axially with respect to the housing. At its upper end, approximately one-third of the height of lower pedestal portion 22a, housing 88 is covered by an annularly inward converging roof plate 92, which in turn supports a hollow tubular structural member 94 extending upwardly toward universal joint 74. A low friction bearing member 96 for lower drive shaft 76 is carried at the upper end of structural member 94, the drive shaft being provided with a head 98 which sits over and is rotatable with respect to a cap 100 inserted into bearing member 96. Pedestal support is provided by means of a rigid rotor member 102 which has a rim 104 welded to the inner wall of the pedestal, and a hub 106 which rests on bearing member 96 and rotates thereabout.

Drive pulley 46 is encircled several times by a guide wire 4 to insure good traction and eliminate slippage between the two components. The sprinkler apparatus is propelled across the ground by rotating pulley 46 about its axis, and thereby causing the pulley to wind up on guide wire 4 in one direction and to play out an equal amount of guide wire in the opposite direction. The rim of pulley 46 is preferably coarse in texture to enhance traction, or the guide wire may be provided in an alternate form such as a link chain which engages corresponding sprockets on the periphery of the pulley.

Pulley 46 is coupled by means of a transmission 106, housing within casing 88, for rotation by lower drive shaft 76. In the exemplary embodiment shown, transmission means 106 includes a two stage planetary gear reduction means for driving pulley 46 at a speed reduced from the speed of drive shaft 76, preferably by a 36:1 ratio. Exemplary of planetary gear transmissions adaptable to the present invention is the disclosure of co-pending application, Ser. No. 694,904 "Power Transmission For Self-Propelled Irrigation System", filed and assigned to the assignee of the present invention.

A two-stage gear reduction system is employed, with drive shaft 76 connected at its lower end to an input drive gear 108 which intermeshes with three planet gears, of which gears 110a and 110b are shown in FIG. 4. The planet gears are mounted on a first planetary carrier 112, and intermesh with an internally geared surface 114 of casing 88 so as to rotate about the pedestal axis when input drive gear 108 rotates. In thus rotating, the planet gears 110 process about internal gear surface 114 and in so doing rotate planet carrier 112. A sun gear 116 depends from first planet carrier 112 and rotates therewith to drive a second set of three planet gears, of which gears 118a and 118b are shown in FIG. 4. A second planet carrier 120 is driven by planet gears 118 in the same manner as first planet carrier 112 is driven by first planet gears 110. Depending axially from the underside of second planet carrier 120 is a transmission output drive shaft 122 which is secured at its lower end to rotationally drive pulley 46. A guide collar 124 extends upwardly from mounting plate 56 annularly adjacent a packing 125 for output drive shaft 122 to prevent excessive oscillations of the drive shaft. An O ring 126 is lodged in a recess of the lower inner end of collar 124 to provide a low friction seal for the transmission lubricants.

As may be seen, planet gears 110 and 118 each comprise a pair of gear segments. The use of segmented planet gears increases the efficiency and reliability of the planetary gear assembly as the load on the assembly increases. Through the double system of planetary gears, the high speed of input drive gear 108 is reduced by a sequential transmission through the series of planetary gear assemblies to a low speed, high torque drive at transmission output shaft 122, and thereby at drive pulley 46.

The sprinkler support pedestal is continually rotated in an oscillatory motion during transit over a field by means of link 68, which is pivotally attached at one end to an off-center portion of drive pulley 46 by a first rivet and by spring biased link 70, which is pivotally attached at one end to the periphery of pedestal 22. Further details of the oscillating mechanism are shown in FIGS. 5, 6 and 10. Link 68 is a solid rod, while spring biased link 70 comprises a hollow cylinder 130 pivotally connected at one end to bell crank 66, a coil spring 132 housed within the cylinder, a connector rod 134 pivotally attached to a tab 135 on the periphery of pedestal 22 and extending into cylinder 130 at its other end, a head 136 affixed to the end of connector rod 134 within the cylinder adjacent spring 132, and a second coil spring 138 surrounding connector rod 134 and lodged within the cylinder between head 136 and a cylinder bushing cap 140. Bell crank 66, shown in FIG. 6, comprises an outer mounting block 142 welded to the side of beam 54, a low friction cylindrical bearing 144 disposed in a vertical bore in the mounting block, and a pin 146 extending through bearing 144 with arms 148 and 150 rigidly attached to its opposite ends adjacent the periphery of mounting block 142. Link 68 and cylinder 130 are pivotally attached to arms 148 and 150 by rivets 152 and 154, respectively. In operation, a rotation of drive pulley 46 to propel the sprinkler is transmitted by link 68 to an oscillatory movement of bell crank 66 about pin 146. This movement in turn is transmitted via link 70 to support pedestal 22, causing that member to oscillate back and forth through a limited rotational path so that the sprinkler sprays over an arc of approximately 30° as it traverses the field, enhancing the dispersion of water over the field.

Referring again to FIG. 3 in conjunction with FIGS. 4 and 5, means are shown for reversing the direction of sprinkling when the sprinkler has completed traversing a field in one direction and is about to return in the opposite direction. Shift rod 48 is provided with transverse contact arms 156a and 156b at its opposite ends, which arms normally rest upon guide wire 4 and are positioned to contact one of the rod stops 14 as the sprinkler approaches the stop at the end of a traverse. A wire 158 is attached to shift rod 48 at space locations by fasteners 160, and encircles a pulley 162 welded to the lower outer periphery of sprinkler support pedestal 22. Near the end of a traverse one of the shift rod contact arms 156 will hit a rod stop 14, holding the shift rod stationary as the sprinkler continues to move towards the stop. The relative motion thus produced between the shift rod and the remainder of the sprinkler apparatus causes wire 158 to rotate pulley 162 and thus pedestal 22. The dimensions of shift rod 48 and the spacing between wire fasteners 160 are selected such that sprinkler support pedestal 22 is shifted substantially by 180°.

FIG. 8 illustrates the position of the various oscillating and sprinkler rotation elements, with pedestal 22 rotated 180° from the position shown in FIG. 5. In this position the sprinkler is ready to traverse a field in the direction indicated by arrow 162. In rotating from the position of FIG. 5 to that of FIG. 8, pedestal 22 has moved in a counterclockwise direction. During the first half of this movement rod 134 moves against spring 132 further into cylinder 130, and then returns to near its original position with respect to the cylinder as the pedestal continues rotating to the position shown in FIG. 8.

Apparatus for rotating control rod 50, and thereby reversing the direction of sprinkler travel, is shown in FIGS. 2-4 and 7. The lower end of the control rod 50 is held adjacent pedestal 22 by a U-shaped bracket 164. The rod terminates in an outwardly bent finger 166, through which a pin 168 secured to spring 52 extends. The other end of the spring is attached to a bracket 170 which extends upwardly from beam 54 to the level of rthe control rod. As shown in FIG. 7, the dimension of spring 52 is such that it is slightly stretched when pedestal 22 is at a fully rotated operating position, and acts upon finger 166 to hold control rod 50 in a first rotational position with respect to pedestal 22.

When the pedestal is rotated by 180° at the end of a traverse, as described above, spring 52 acts upon finger 166 to rotate control rod 50 in a clockwise direction with respect to the pedestal, terminating in the position shown in FIG. 9. In order to ensure a complete 180° rotation of the pedestal and prevent the sprinkler propulsion apparatus from stalling, spring 52 is tensioned so that control rod 50 does not rotate on the pedestal until just before the pedestal has reached the end of its 180° rotation. Various snap action devices may be incorporated on control rod 50 and its associated support structure to prevent an earlier rotation of the rod, and to ensure that the rod rotates fully at the required time.

Details of the water powered drive mechanism for drive pulley 46 are provided in FIGS. 11-13. Pelton wheel 38 provides an actuating power input, driving the input gear to a three-stage planetary gear system housed in a transmission casing 192, which produces an output rotational drive on upper drive shaft 72. The gear system effects a 200:1 speed reduction between Pelton wheel 38 and the upper drive shaft. A support structure 174 for the transmission housing and upper drive shaft 72 is provided internally within pedestal 22, and rotates with the pedestal.

It will be recalled that Pelton wheel 38 is driven by a water jet from jet mechanism 34. The jet support rod 40 is rotatably mounted to pedestal 22 between a pair of nuts 176 and 178 on a pivot pin 180, which pin extends outwardly from a base plate 82 welded to the exterior of upper pedestal portion 22b. Support rod 40 is rotatable about pin 180 between spaced stops 42a and 42b welded to pedestal 22b above pin 180. The support rod terminates at its lower end with an outwardly extending finger 186, which is coupled to a similar finger 188 at the upper end of control rod 50 by a torsion spring 190. Axial rotation of the control rod 50 is transmitted through spring 190 and received as a rotational movement by jet support rod 40, as indicated in FIG. 12.

The water jet assembly 34 is carried at the upper end of support rod 40 and bolted in place between a lower plate 192, welded to the upper end of the support rod 40, and an upper plate 194. Jet assembly 34 comprises a pair of spaced outlet orifices 196a and 196b having a common inlet pipe 198 which is supplied with water from conduit 36. The jet assembly is disposed such that Pelton wheel 38 is rotated by a jet of water emitted by one or the other of orifices 196a and 196b. As best shown in FIG. 13, the rotational direction of Pelton wheel 38 is determined by which one of the two water jets is incident upon the wheel. This in turn determines the rotational direction of drive pulley 46, and accordingly the direction in which the sprinkler is propelled across the field. In FIG. 13 the water emitted from left hand orifice 196a is shown striking Pelton wheel 38, causing it to rotate in a clockwise direciton as seen from above. This corresponds to the orientation of control rod 50 as shown in FIG. 9. At the end of a traverse, control rod 50 is rotated with respect to pedestal 22 as described above, and assumes the position shown in phantom lines in FIG. 13. In this position the water jet emitted from right hand jet orifice 196b strikes Pelton wheel 19 and causes it to rotate in a counter-clockwise direction, thereby reversing the direction of sprinkler travel. The positions of support rod 40 corresponding to clockwise and counter-clockwise Pelton wheel rotation are indicated in FIG. 12 in solid and phantom lines, respectively.

Figure 14:
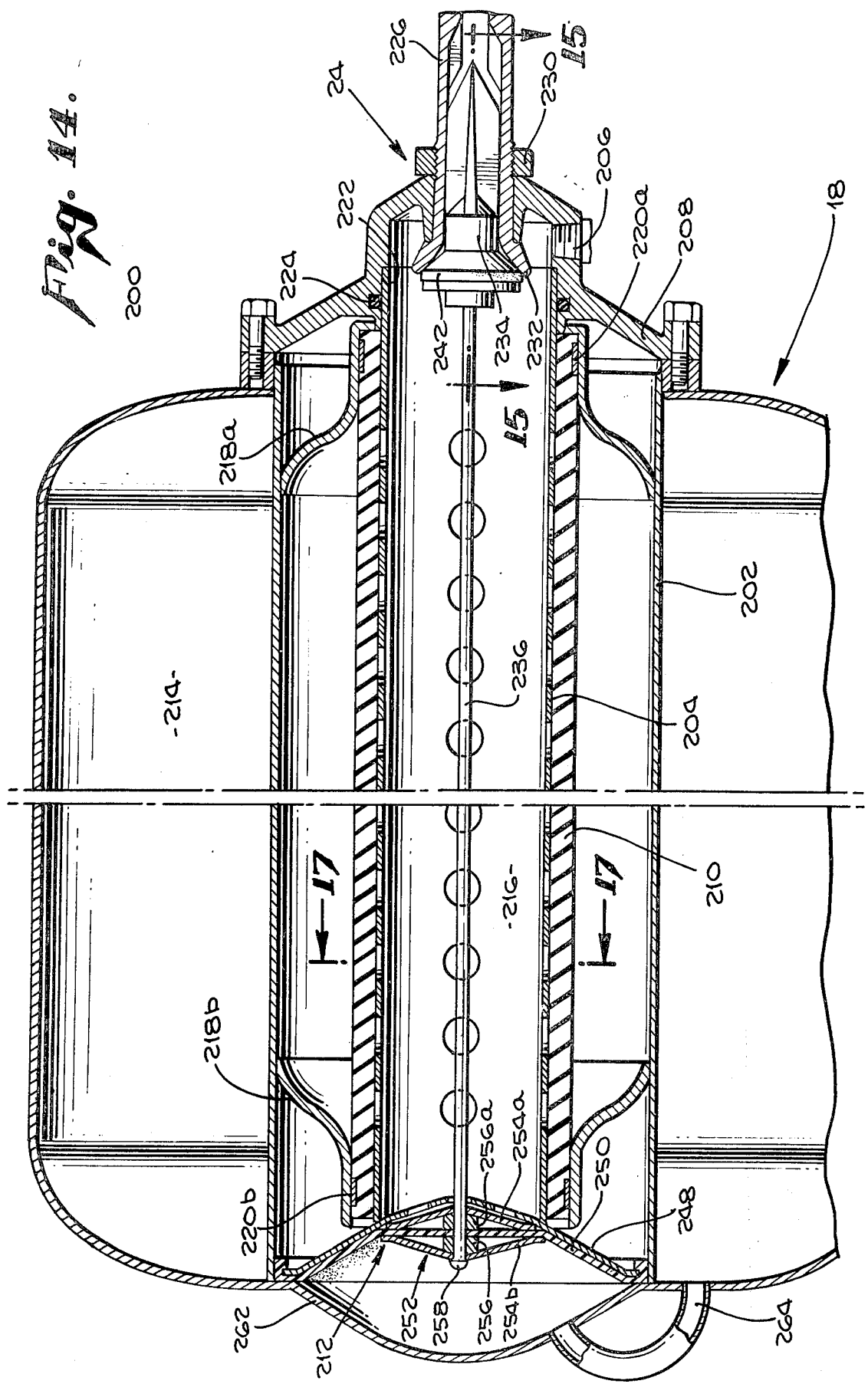
FIG. 14 is a sectional view, through the plane 14—14 of FIG. 2, of apparatus constructed in accordance with the invention for emitting an intermittent long distance spray.

Referring now to FIG. 14, water accumulator housing or tank 18 comprises in general an outer tank portion 200, an inner casing 202 defining an interior reservoir, a perforated cylinder 204 positioned to receive a water supply through a port 206 in a cap 208 bolted over tank 200, a resiliently flexible, rubber-like bladder 210 retained between cylinder 204 and casing 202 and normally resting against the outer surface of cylinder 204, and a diaphragm section generally indicated at 212 which is used to actuate an intermittent, long distance spray.

The various sprinkler sections will now be described in further detail. Casing 202 divides tank 200 into two sections: an outer air plenum 214 between the external wall of casing 202 and the inner wall of tank 200, and a water reservoir 216 internal to the bladder. Annular fittings 218a and 218b are attached respectively at the upper and lower portions of the tank between casing 202 and bladder 210 to further define the limits of the water reservoir. Annular gaskets 220a and 220b are provided in corresponding grooves in bladder 210 to seal the joints between the bladder and fittings 218a and 218b. An annular channel 222 is formed in the inner wall of tank cap 208 to accomodate the upper end of perforated cylinder 204, with an O-ring seal 224 disposed in an annular groove which opens to channel 222.

Details of the nozzle assembly are shown in FIG. 15. A shaped member 226 defining an outlet orifice is held in a central opening in cap 208, between a downward facing shelf 228 on the cap and an interior threaded ring 230 which engages matching threads on the outer surface of outlet member 226 just above cap 208. The lower end of outlet member 226 is flared outwardly to form a seat 232 for a valve which controls the discharge of irrigating water through outlet member 226. A piston 234 is retained in outlet member 226 at the upper end of a connector rod 236 from diaphragm section 212. A plug 238 is threaded into the lower end of piston 234, and includes a central opening adapted to receive a ball 240 at the upper end of connector rod 236 and retain said ball against piston 234. A rubber-like valve washer 242 extending radially outwardly from piston 234 is retained at the lower end of the piston, between a downward facing shelf 243 on the piston faces of piston 234 and plug 238. Valve washer 242 is aligned with flared valve seat 232 to form a seal and block the escape of any water from tank 200 outwardly through outlet member 226 when connector rod 236 is in the raised position shown in FIG. 15. The upper portion of piston 234 comprises a plurality of vanes 246 adapted to form water discharged through outlet 226 into a suitable long-distance irrigating stream.

Referring back to FIG. 14, diaphragm section 212 includes a downward facing metallic bowl 248 which is secured to the lower end of cylinder 204 and extends outwardly towards the lower end of casing 202, a stiffly flexible, resilient bowed diaphragm 250 spanning the lower end of casing 202 and retained at its outer edge between bowl 248, casing 202, and tank 200, and connector means 252 securing a central portion of diaphragm 250 to the lower end of connector rod 236. Connector means 252 comprises a pair of bowed plates 254a and 254b which are centrally secured to opposite faces of diaphragm 250 such that the portion of the diaphragm between the plates is held flat, and a pair of sealing gaskets 256a and 256b lodged between the diaphragm and each of the bowed plates, respectively. Each of the above mentioned members of the diaphragm section is provided with an axial opening of sufficient dimension to accomodate connector rod 236, which extends through the axial openings and is retained against the lower face of plate 254b by a knob 258 at its lower end. The portion of bowl 248 interior to cylinder 204 has a plurality of perforations which enable diaphragm 250 to be flexed downwardly by the pressure of the water in reservoir 216. The lower end of tank 200 is shaped with an outward bulge forming a second plenum 262 to increase the distance through which diaphragm 250 may flex. The second plenum below the diaphragm is connected to first plenum 214 through a conduit 264, thereby enabling the escape of air from directly below the diaphragm as the diaphragm is flexed downwardly.

The operation of the accumulator tank will now be described with reference to FIGS. 14 and 16. In FIG. 14 it may be assumed that a water stream has just been discharged from the tank, and it is ready to begin another sprinkling cycle. Some residual water is left in reservoir 216, but its volume will be insufficient to appreciably expand bladder 210 away from contact with the outer wall of cylinder 204, which forms a substrate limiting inward contraction of the bladder. Also, diaphragm 250 is shown in its normal upward position adjacent bowl 248. In this position piston 234 is forced upward into outlet 226, pressing valve washer 242 against valve seat 232 and thereby preventing any water from leaving the tank through the outlet.

As water accumulates in the tank, bladder 210 is gradually expanded laterally outward away from cylinder 204, until eventually it comes into contact with casing 202. As water continues to accumulate, casing 202 limits further expansion of the bladder, and the water pressure therein builds up until it exceeds the air pressure below diaphragm 250 by an amount sufficient to flex the diaphragm downwardly. This in turn unseats piston 234 from outlet 226, permitting water to be discharged under pressure through the outlet in an irrigating stream. The initiation of outward water flow reduces the net closing pressure against piston 234, causing diaphragm 250 to snap downward to a position, shown in FIG. 16, against tank bulge 262. The interior water pressure forces a high speed stream through the outlet, resulting in a long distance irrigation.

As the volume of water inside the tank is progressively reduced, bladder 210 flexes back towards its original position from the outward flexed position shown in FIG. 16, thereby retarding a decrease in water pressure inside of the tank and sustaining a high speed water flow through the outlet for a greater volume of water than would be achieved without the use of an inflatable means such as bladder 210. The outward water flow continues until bladder 210 has returned to its original position adjacent cylinder 201, at which time the reduced water pressure inside the tank causes diaphragm 250 to flex back upwardly to the position shown in FIG. 14, forcing piston 234 upward until the valve formed by washer 242 and seat 232 is closed. At this point a spraying cycle is completed, and another cycle commences as water is introduced into the tank through inlet port 206.

In operation, water enters the bladder reservoir under a line pressure of typically 100 p.s.i. and accumulates until the water pressure in the bladder reaches a threshold level of about 95 p.s.i. At this pressure diaphragm section 212 moves down, permitting a burst of water to be discharged through the outlet orifice. When enough water has been discharged to reduce the bladder water pressure to a second threshold level, typically about 76 p.s.i., the nozzle is again closed and water again begins to accumulate in preparation for another burst. With the drive systems described above, the sprinkler is preferably propelled at a speed of about one foot per minute, and delivers about 1,600 gallons per acre on each run.

Figure 18:
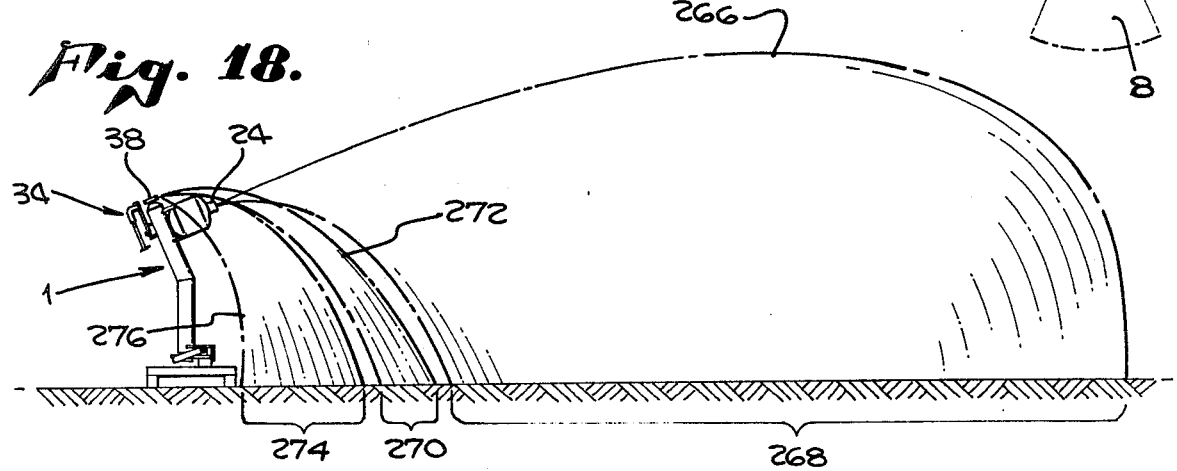
FIG. 18 is an elevation view illustrating the spray pattern achieved with the embodiment of FIGS. 1-17.

A typical spray pattern achieved with the sprinkler system described thus far is illustrated in FIG. 18. The intermittent stream 266 emitted from nozzle 24, due to its relatively greater volumetric flow rate and expulsion pressure from the sprinkler, is dispersed over a broad area 268. An intermediate and much smaller area 270 is covered by the continual stream 272 from jet means 34 which does not impact Pelton wheel 38. The area 274 closest to the sprinkler is irrigated by stream 276 from the other jet produced by jet means 34 which drives the Pelton wheel. While the continual irrigating streams 272 and 276 provide some relatively close-in irrigation that would not otherwise be achieved, it should be understood that the primary irrigation results from the long distance intermittent spray.

Referring now to FIG. 19, another embodiment of the invention is shown in which a traveling intermittent sprinkler is employed in conjunction with a center pivot irrigation system. In the exemplary embodiment this system may be of the type described in U.S. Patent Application Ser. No. 746,856, filed Dec. 2, 1976, entitled "Speed Control Means for Center Pivot Irrigation System", the contents of which are hereby incorporated herein by reference. This system includes a center pivot, indicated generally at 278, comprising a housing 280 mounted on a stationary base seated upon the field to be irrigated. Water is supplied via supply conduit 282, and is passed through housing 280 to a pivotally mounted, rotating elbow conduit fitting 284 connected to the first conduit section 286 of a first span unit indicated generally at 288. The irrigation system comprises a plurality of individual span units, which are interconnected in a continuous linear array extending outwardly from the center pivot for several hundreds of feet to an end span unit. For simplicity only the first span unit 288 and an end span unit $288^1$ are illustrated in FIG. 19. These span units are interconnected by a collar joint 290.

Each span unit carries a plurality of interconnected water conduits 286, $286^1$ by means of a wheeled carriage 292, $292^1$ and associated trusses 294, $294^1$, in a known manner. Each carriage includes a pair of drive wheels, each wheel being provided with a motor means operated by hydraulic fluid such that the individual span units are individually self-propelled by their associated hydraulic motor means. As described in the referenced patent application, the individual span units are controlled to remain in a generally linear alignment as the system rotates about its center pivot 278. Irrigation is achieved by a plurality of sprinkler heads 296, $296^1$ provided on the upper part of conduits 286, $286^1$, which continually spray the portion of the field in their immediate vicinity as the system rotates.

At the outer end of end span unit $288^1$ and mounted on conduit $286^1$ is an outwardly directed, intermittent sprinkler 298 such as the sprinkler shown in FIGS. 14–17. Details of its mounting and interconnection with the center pivot system are shown in FIG. 20. This sprinkler has an outer tank 300 mounted at the top of a support pedestal 302, which in turn is rotatably supported at the end of conduit $286^1$. An inner shaft 304 extends downwardly from pedestal 302, and is provided at its lower end with a beveled gear 306. A matching bevel gear 308 engages gear 306 and is supported by an apertured post 310 which extends upwardly from carriage $292^1$. Gear 308 is connected by a shaft 312 through post 310 to a crank which comprises a first pivot arm 314 connected at one end to the shaft, and at its other end to a second pivot arm 316. Arm 316 in turn is pivotally connected to an offset pin 318 on one of the drive wheels 320 for the end span unit, as seen in FIG. 21. Rotation of wheel 320 as the irrigation system circles the field causes pivot arm 316 to reciprocate generally up and down, which in turn pivots arm 314 back and forth. This pivoting movement is transmitted to the sprinkler through bevel gears 306 and 308, causing the sprinkler to oscillate through approximately a 30° arc as the irrigation system moves.

Water is supplied to sprinkler 298 from conduit $286^1$ by means of a pump 322, which is mounted on the conduit and receives a water input therefrom through a hose 324 which extends into the conduit through a fitting 326. Another hose 328 connects the sprinkler to the pump output orifice. An electrical supply for the pump is provided over wires housed in a duct 330 which is mounted to the side of conduit 286[1] and extends back to the center pivot area. Pumpe 322 increases the pressure of the water supply to sprinkler 298 from a pressure within conduit 286[1] of approximately 80 p.s.i. to an operating pressure level of approximately 120 p.s.i., at which it intermittently produces a long distance irrigating spray as described above.

The system shown in FIG. 19 may be advantageously employed to appreciably increase the area irrigated by a center pivot system with a less than proportional increase in capital cost. Without the intermittent sprinkler, a center pivot system produces a circular irrigation pattern, indicated by circle 332 in FIG. 25. When a larger area is to be irrigated a plurality of center pivot systems are used, each irrigated circular field being approximately tangential to the adjacent fields. This results in a relatively large area outside of each circle which is not covered by any of the irrigation apparatus and is essentially unused. This is the area outside circle 332 but inside a square 334 drawn around the circle. With the addition of long distance intermittent sprinkler 298, this area can be effectively covered and added to the total productive land. The employment of an intermittent device enables a larger area to be covered without oversaturating the ground with water. In the preferred embodiment the intermittent sprinkler is operated only for a portion of the total sprinkling cycle, when it is adjacent the otherwise unused part of the field. As indicated in the figure, this occurs over arcs 336 of approximately 45° at the corners of square 334. The sprinkler is turned off over the 45° arcs 338 between corners, since in this range the center pivot system most nearly covers the whole area of the square.

Electrical control apparatus for operating the intermittent sprinkler as indicated in FIG. 25 is shown in FIGS. 22-24. Referring first to FIG. 22, a switch housing 340 is mounted to the vertical portion of elbow pivot fitting 284 by a bracket 342. Switch housing 340 rotates with the center pivot over a track on the upper surface 344 of pivot housing 280 which comprises four spaced ramps 346, each extending circumferentially for an arc of approximately 45°, and mutually separated by similar 45° arcs. Ramps 346 are positioned in radial alignment with the corner arcs 336 of the field for which irrigation is desired. Referring now to FIGS. 23 and 24, a pair of electrical supply lines 348 for the intermittent sprinkler water pump are terminated at switch housing 340. A microswitch is provided inside housing 340 for connecting these wires to a source of electrical supply (not shown). The switch is operated by a plunger 350 which extends below housing 340 and carries a wheel 352 at its lower end. Wheel 352 rides on the upper pivot housing surface along the track formed by ramps 346. In FIG. 23 the switch is shown in a lowered or off position, with wheel 352 between ramps. In FIG. 24 the irrigation system has pivoted so that wheel 352 is now riding on top of one of the ramps 346, raising plunger 350 to turn the microswitch on and supply power to the water pump, thereby enabling operation of intermittent sprinkler 298. As the system continues to rotate the microswitch is cyclically turned on when sprinkler 298 is within one of the field side arcs 338. The amount of land under irrigation is thereby considerably increased with only a relatively small increment in capital investment.

Referring now to FIGS. 26 and 27, another embodiment of a traveling intermittent sprinkler is shown in which the support and driving structure for the sprinkler shown in FIGS. 2-13 is adapted for a larger capacity sprinkler which carries a correspondingly heavier water load. The general features of the support structure shown in FIG. 26 are the same as in the embodiment described above. A rotatable support pedestal 354 is provided with an outer pulley 356 for reversing the direction of sprinkling at the end of a traverse. An upper drive shaft 358 is connected via universal joint 360 to a lower drive shaft 362, which in turn operates a gear reduction system housed in transmission housing 364 to rotate a drive pulley 366. Apparatus for oscillating the support column is also provided, of which a pivot arm 368 is shown attached to the other side of pulley 366. A base plate 370 is attached in cantilever fashion to a circular beam 372 supported on the sprinkler sled; if desired another beam may be provided on the other side of the base plate for additional support.

The strengthened structure of the sprinkler support apparatus is shown in greater detail in FIG. 27. In place of cylindrical tubular member 94 shown in the embodiment of FIG. 4, a conically tapered member 374 is provided with an outwardly directed flare 376 at its lower end which rests upon and is bolted directly to plate 370. Support pedestal 354 is carried on member 354, and a low friction annular bearing 380 seated in a shelf 382 provided at the upper end of structural member 374. Fitting 378 and bearing 380 are mutually engaged along an annular sloped interface, whereby structural member 374 provides vertical support for pedestal 354 while preventing any appreciable horizontal movement of the column. A bearing seal 384 for the lower drive shaft 362 sits over the upper open end of structural member 374. At its lower end pedestal 354 terminates in an outwardly flaring lip 386, which sits under an annular ring member 388 attached to the upper surface of flare 376 by the same bolts 390 which hold the flare to the base plate.

Transmission casing 364 is located below the base plate 370 and secured thereto by bolts 390 engaged in threaded bolt holes in the casing. A rotary drive movement is imparted to drive pulley 366 from lower drive shaft 362 by a double planetary gear arrangement generally similar to the one described in conjunction with FIG. 4, but employing larger and stronger gears. The principal features of a traveling, intermittent sprinkler are thus retained in this embodiment, while greater strength is provided to support a greater water volume for longer distance or higher saturation spraying.

Another embodiment of the invention which employs a different drive and water discharge structure is shown in FIGS. 28-43. Referring first to FIG. 28, an agricultural sprinkler system is shown. Individual agricultural sprinklers 402a, 402b, 402c, and 402d are each adapted to irrigate a strip configured area of the field which they traverse. Each sprinkler is propelled along a linear rigid guide rod 404a, 404b, 404c, and 404d respectively, which extends across a portion of the field between guide rod anchors 406a/406b, 406c/406d, 406e/406f, and 406g/406h, respectively.

Each sprinkler is mounted on a base 408 which is, in turn, mounted on runners 410a and 410b. Runners 410a and 410b are provided with tip portions 412 having generally upward sloping lower surfaces which allow runners 410a and 410b to traverse uneven terrain with a minimum amount of resistance. Additionally, span members 414a and 414b are provided to retain runners 410a and 410b in a generally parallel spaced relationship, as may be seen in FIG. 29.

Means shown generally at 420 are provided for propelling base 408 along linear rigid guide rod 404 in a run across the field. A pair of pinch wheels 422a and 422b are mounted in adjacent relation to base 408 and pinch linear rigid guide rod 404 firmly, as is best seen in FIG. 35.

In an exemplary embodiment of the present invention, pinch wheels 422a and 422b are formed of a resilient material which allows the pinch wheel to be slightly deformed by pressure. Pinch wheels 422a and 422b are mounted such that when linear rigid guide rod 404 is positioned within guide rod grooves 424a and 424b of pinch wheels 422a and 422b respectively, skirt portions 425a and 425b of pinch wheels 422a and 422b respectively are slightly deformed generally in the direction of journal 426a and 426b of pinch wheels 422a and 422b respectively. This deformation of skirt portions 425a and 425b biases guide rod grooves 424a and 424b generally toward each other thereby "pinching" linear rigid guide 404 between pinch wheels 422a qnd 422b. In thus providing an inherently biased relationship of pinch wheels 422a and 422b toward linear rigid guide rod 404, provisions for adjusting the tension of pinch wheels 422a and 422b with respect to linear rigid guide rod 404 may be eliminated.

Transmission means, shown generally at 440 in FIG. 35, drive pinch wheels 422a and 422b as they rotate against linear rigid guide rod 404. In the exemplary embodiment shown, transmission output drive shaft 430a which drives pinch wheel 422a, is provided with gear 432a which is positioned by gear key 434a. Gear 432a intermeshes with gear 432b which is attached to drive shaft 430b by gear key 434b. Thus, any rotation of transmission output drive shaft 430a is transmitted by gear 432a to gear 432b, then to drive shaft 430b. It may be seen that a coordinated 1:1 drive between drive shaft 430a and 430b is thus achieved and a 1:1 drive of pinch wheels 422a and 422b fastened thereto by retainers 428a and 428b results.

As is shown in FIG. 36, pinch wheels 422a and 422b counter-rotate with respect to each other and, due to the "pinching" action between skirt portions 425a and 425b of pinch wheels 422a and 422b respectively, tend to pull base 408, and hence sprinkler 402, along linear rigid guide rod 404.

As is shown in FIG. 35, drive shafts 430a and 430b, and gears 432a and 432b which are keyed to drive shafts 430a and 430b by gear keys 434a and 434b respectively, are all contained within transfer case 436 which is rigidly attached to frame 408. Bearing members 438a and 438c provides a low friction seal between drive shaft 430a and transfer case 436. Bearing members 438b and 438d provide a low friction seal between drive shaft 430b and transfer case 36.

As is shown in FIG. 35 and in the detail views thereof shown in FIGS. 37-39, transmission means shown generally at 440 provide input power to transfer case 436 and hence, drive both pinch wheels 422a and 422b. In the exemplary embodiment shown, transmission means 440 includes planetary gear reduction means for driving pinch wheels 422a and 422b at a spaced greatly reduced from the speed of input drive shaft 506 which is connected to input drive gear 446. Exemplary of planetary gear transmissions adaptable to the present embodiment is the transmission disclosed in co-pending application, Ser. No. 694,904; Power Transmission for Self-Propelled Irrigation System, referred to above.

The planetary gear speed reducing transmission of the present invention shown in FIGS. 35 and 37-39 has an outer transmission case 442 and a transmission top cover 494 secured thereto by top retainer and mounting means shown generally at 496a and 496b. Input shaft 506 is connected to input drive gear 446 by coupling 502 which is supported within coupling journal 498 by bearings 504a and 504b.

Input drive gear 446 intermeshes with planet gears 450a, 450b and 450c which are mounted on planetary carrier 452 of first planetary gear assembly 448. As input drive gear 446 rotates, planet gears 450a, 450b and 450c which also intermesh with internal gear surface 444 of transmission case 442 also rotate. In thus rotating, planet gears 450a, 450b, and 450c precess about internal gear surface 444 and in doing so, rotate planet carrier 452.

First sun gear 454 which is formed integrally with planet carrier 452 rotates with planet carrier 452 and drives planet gears 458a, 458b and 458c of second planetary gear assembly 456. Planet carrier 460 is driven in the same manner as planet carrier 452, and in turn, drives planet gears 466 of third planetary gear assembly 464. Planet carrier 468 and integral sun gear 470 are rotated in the same manner as planetary carriers 452 and 460 and, in turn, drive planet gear 474 of fourth planetary gear assembly 472. As may be seen in FIG. 37, planet gear 474 comprises gear segments 476a and 476b. The use of segmented planet gears increases the efficiency and reliability of the planetary gear assembly as the load on the assembly increases.

Planet carrier 478 and integrally formed sun gear 480 are driven by planet gear 474 in the same manner as has been previously discussed. Sun gear 480 drives planet gears 484 of the fifth planetary gear assembly 482 which, in turn, drive planet carrier 488. Planet gears 484 comprise gear segments 486a, 486b, 486c and 486d, as may be seen in FIG. 37.

Planet carrier 488 which is driven by planet gears 484 is rigidly affixed to transmission output drive shaft 430a. Thus, the high speed of input drive gear 446 is reduced by a sequential transmission through a series of planetary gear assemblies to a low speed, high torque drive at transmission output shaft 430a which is also the drive shaft for pinch wheel 422a.

In the exemplary embodiment of the present invention, water powered means are provided for driving input drive shaft 506 and input drive gear 446. In order to supply a flow of water to the water powered drive means shown generally at 500 in FIGS. 30, 31, 40, and 41, bifurcating means 512, shown in FIG. 32, are provided for dividing a flow of water from a source main water supply conduit shown in FIG. 29.

As has been mentioned previously, upon reaching the right-hand side of the field, as is shown in FIG. 29, shift or operating rod 522 contacts rod stop 524 and is effectively moved from right to left with respect to agricultural sprinkler 402 as is shown in FIG. 43. This relative movement with respect to agricultural sprinkler 402 reverses the direction of travel of agricultural sprinkler 402 by operating reversible valve 528, which is connected to operating rod 522 by means of an operational interconnection by an overcenter spring 534 between lever arm 530 of reversible valve 528 and mounting tab 532 of operating rod 522, from the position shown in FIG. 42 to the position shown in FIG. 43. In moving reversible valve 528 to the position shown in FIG. 43, the flow of drive water through drive water conduit 514 is diverted from drive water supply conduit 516a to drive water supply conduit 516b. This results in the supply of drive water being diverted from water powered drive nozzle 510a to water powered drive nozzle 510b as is shown in FIG. 29. As is readily apparent from FIGS. 40 and 41, in diverting the drive water supply from nozzle 510a to nozzle 510b, the drive water flow strikes water turbine wheel 508 on an opposite and reverses the rotation of water turbine wheel 508. In thus reversing the direction of water turbine wheel 508, input drive shaft 506 which provides a non-rotatable connection between water turbine wheel 508 and input drive gear 446 to transmission 440 also reverses its direction of rotation. And, due to the reversal of input drive gear 446, transmission 440 reverses its direction of rotational drive through transmission output drive shafts 430a and 430b to pinch wheels 422a and 422b, thereby reversing their direction of rotation and their direction of travel and hence the direction of travel of the agricultural sprinkler with respect to linear rigid guide rod 404.

As may be seen from the foregoing discussion, the diversion of a portion of the water flowing through main water supply conduit 416 directs a portion of the flow to water powered drive means 500 through drive water conduits 514, as is best shown in FIG. 32. Drive water conduit 514 is connected between bifurcating means 512 and reversible drive means for driving water powered input drive 500 in either direction.

Water powered input drive 500 is provided with water turbine wheel 508, and water powered drive nozzles 510a and 510b. As may be seen in FIGS. 40 and 41, the water powered drive nozzles 510a and 510b are mounted to mounting plate 536 by means of retainers 538a and 538b respectively, and are aligned such that water from water powered drive nozzles 510a and 510b will rotate water turbine wheel 508, which is mounted to mounting plate extension 536a, in opposite directions respectively.

To provide a reversible drive, water is selectively directed through either drive water supply conduit 536a or 536b to either drive nozzle 510a or 510b respectively. As is best shown in FIGS. 29, 42, and 43, as the sprinkler reaches the end of a run, operating shift rod 522 comes in contact with rod stop 524. Agricultural sprinkler 402 continues to move in the initial direction of travel and, as rod 522 can no longer move in that direction, rod 522 slides through rod bushings 526a and 526b with respect to an initial position relative to agricultural sprinkler 502 and, in so shifting its position, rod 522 operates the reversible drive means.

In viewing FIG. 29, the direction of travel of agricultural sprinkler 502 is from right to left. Operating rod 522 has just moved away from rod stop 524 after reversing the direction of drive of the sprinkler. A better understanding of this drive reversal may be obtained by a careful examination of FIGS. 42 and 43. FIG. 42 represents the configuration of the reversible means prior to the direction change, while FIG. 43 shows the configuration of the reversible means after the direction change. A constant uniform drive of agricultural sprinkler 402 is produced which reverses the direction of sprinkler travel each time the sprinkler reaches an end of a run across a field.

Sprinkler 402 is provided with nozzle means, including in the exemplary embodiment a pair of water spraying nozzles 540a and 540b, and means for mounting the nozzles on base 408 in such a manner that they face in generally opposite directions with respect to each other and generally laterally of the direction of travel of base 408 as is shown generally in FIG. 28. Means are provided for supplying water intermittently to the nozzle means during a run across an agricultural field to irrigate a strip configured area of the field having area portions on either side of base 408 as base 408 travels along linear rigid guide rod 404 across the field. Such means in the exemplary embodiment of the present invention comprise the provision of water accumulator means, as water accumulator tank 560, for accumulating water from main water supply conduit under pressure until a predetermined volume of water is accumulated.

As is best seen in FIG. 32, water accumulator tank 560 receives water from main water supply conduit 416 through a one-way check valve 418. As the volume of water within water accumulator tank 460 increases, air trapped within the tank is compressed into a smaller volume. As the trapped air is compressed the pressure against pressure responsive piston 570a within cylinder 570b is increased. A rolling diaphragm seal 592 is provided between pressure responsive piston 570a and cylinder 570b to prevent loss of air pressure therebetween.

When a pre-determined volume of water is accumulated within tank 560, the compressed air above the water within water accumulator tank 560 will exert a force against pressure responsive piston 570a sufficient to move the piston within cylinder 570b. Connecting rod 574 between piston 570a and intermittent water supply valve 562 transmits any movement of piston 570a to intermittent water supply valve 562, thereby opening outlet port 562a to outlet chamber 564. As outlet port 562a is opened, the water within water accumulator tank 560 is expelled therethrough by the force of the air pressure above the water. As the accumulator tank empties, the pressure against piston 570a decreases and intermittent water supply valve 562 returns to seat against a lip portion of outlet port 562a and the flow of water into outlet chamber 564 stops. At this point, water accumulator tank 560 is once again sealed and the water received through one-way check valve 418 from main water supply conduit 416 is once again accumulated within tank 560 until such time as the pressure within the tank reaches a pre-determined level and once again operates pressure responsive piston 570 and intermittent water supply valve 562 to empty the tank.

As may be seen in FIG. 32, pressure responsive piston 570a is connected to a linkage assembly shown generally at 580a, 580b, 580c, 580d, and 580e. Linkage arm 580c is secured at pivotal connection 582b to linkage mount 582a and, as pressure responsive piston 570a moves within cylinder 570b, linkage arm 580d transmits the movement to linkage arm 580c.

Bias spring 576 is connected through linkage arms 580a and 580b to linkage arm 580c. As arm 580c is displaced by the movement of pressure responsive piston 570a acting through linkage arm 580d, the tension within bias spring 576 increases. This increase in biasing force exerted by bias spring 576 upon linkage arm 580c generally restricts the movement of pressure responsive piston 570a within cylinder 570b and, when the force exerted by bias spring 576 exceeds the force being exerted against pressure responsive piston 570a by the pressure within tank 560, biasing spring 576 acting through the linkage assembly shown generally at 580 will force pressure responsive piston 570a to return to its original position. This movement will be transmitted by connecting rod 574 to intermittent water supply valve 562, which will close outlet port 562a thereby allowing main water supply conduit 416 to refill water accumulator tank 560 through one-way check valve 418.

Adjustable means 578 are provided to vary the biasing force exerted by biasing spring 576. This adjustment will vary the value of pre-determined air pressure which is required to activate pressure responsive piston 570a and its associated intermittent water supply valve 562 which normally closes outlet port 562a to outlet chamber 564.

A safety pressure release valve 568 is provided to prevent a rupture of water accumulator tank 560 should the pressure responsive valve assembly means of the present invention be adjusted to respond only to an excessively high pre-determined air pressure value or should pressure responsive piston 570a seize within cylinder 570b.

In the exemplary embodiment of the present invention shown in FIG. 32, an automatic air pump shown generally at 590 having a pump piston 594a slideably mounted within pump cylinder 594b, a one-way outlet valve and linkage arm 592 connecting pump piston 594a with linkage arm 580c is provided. The functioning of air pump 590 is coordinated with the functioning of pressure responsive piston 570a by means of linkage arms 580c, 580d, 580e and 592. Any movement of pressure responsive piston 570a within cylinder 570b results in a similar movement of air pump piston 594a within cylinder 594b. Thus, when the pressure within water accumulator tank 560 forces pressure responsive piston 570a to move against the biasing force of bias spring 576 to open intermittent water supply valve 562, pump piston 594a is withdrawn from cylinder 594b which, in turn, results in a zone of reduced pressure within cylinder 594b. Air from an external source is admitted to the zone of reduced pressure within cylinder 594b and, as the pressure within water accumulator tank 560 is reduced by the removal of water through outlet port 562a, bias spring 576 returns intermittent water supply valve 562 to a closed position with respect to outlet port 562a. As outlet port 562a is closed, air within pump cylinder 594b is forced through one-way valve 596 to the air space above the water in water accumulator tank 560.

The air pumping action of air pump 590 replaces any air that is lost from water accumulator tank 560 by becoming entrained within the flow of water through outlet port 562a during the intermittent emptying of water accumulator tank 562. Thus, air pump 590 assures and adequate air supply within water accumulator tank 560 to reliably provide adequate pressure and air compression to properly exhaust water from water accumulator tank 560 into outlet chamber 564 when intermittent water supply valve 562 is opened.

Outlet chamber 564 which receives the water intermittently released from water accumulator tank 560 is provided with an upright portion 564a which is connected to riser conduit 566a by means of a flexible connector 584 which is secured by clamping means 586a and 586b as is shown in FIG. 32. Riser conduit 566a is connected to spraying nozzle supply conduits 542a and 542b by means of inlet venturies 548a and 548b, respectively. Spraying nozzle supply conduits 542a and 542b terminate at water spraying nozzles 540a and 540b, respectively and are supported by conduit support 544a and 544b, respectively, which are attached to support upright 546 of riser conduit cap 586b. As is diagramatically represented by the drawings, the water spraying nozzles 540a and 540b of the exemplary embodiment are mounted facing in generally opposite directions with respect to each other, generally laterally of the direction of travel of base 508.

First conduit 542a and second conduit 542b to water spraying nozzles 540a and 540b respectively are positioned in operable relation to valve means for selectively closing either conduit 542a and 542b means of mounting flange 550a and 550b of inlet venturis 548a and 548b, respectively, as is shown in FIG. 33.

In the exemplary embodiment of the present invention shown in FIGS. 33 and 34, selector valve member 552 which is movable between a first position, as shown in FIG. 33, and a second position as is shown in FIG. 34, is provided for closing first conduit 542a and second conduit 542b, respectively. Mounting means including mount 554a and pivot 554b are provided for mounting selector valve member 552 within riser conduit 566a. In being thus mounted, selector valve member 512 is movable between a first position shown in FIG. 33 which closes inlet venturi 548a of spray nozzle supply conduit 542a and a second position, shown in FIG. 34, closing inlet venturi 548b of second spray nozzle supply conduit 542b.

Selector valve member 552 is provided with over-center spring 556 which interconnects between selector valve member 552 and riser conduit cap 566b to retain selector valve member 552 and riser conduit cap 566b to retain selector valve member 552 in a conduit closed position during water flow out of riser conduit 566 through the other one of the spraying nozzle supply conduits 542a and 542b in a relatively high volume flow rate to the nozzle.

Selector valve member 552 moves between the first position shown in FIG. 33, and the second position shown in FIG. 34, in response to pressure variations on opposite sides of selector valve member 552.

With selector valve member 552 in a first position shown in FIG. 33, water released from water accumulator tank 560 through intermittent water supply valve and outlet port 562 and 562a, respectively, to outlet chamber 564 and thence, to riser conduit 566a, is directed through venturi 548b into conduit 542b. When water accumulator tank 560 is emptied, the flow of water into riser conduit 586a ceases. However, the column of moving water within the riser conduit 586a and spraying nozzle supply conduit 542b will tend to continue in motion through the system. As the water moves through the conduits toward water spray nozzle 540b, a zone of reduced pressure within the conduit follows the water. As the last of the intermittent surge of water passes through venturi 548b to conduit 542b, the zone of reduced pressure is momentarily located adjacent selector valve member 552. The opposite face of selector valve member 552 is exposed to atmospheric pressure through water spraying nozzle 540a, conduit 542a, and venturi 548a. The atmospheric pressure, being higher than the reduced pressure on the opposite side of selector valve member 552, forces selector valve member 552 away from the end of venturi 548a and, as selector valve member 552 passes a center position between venturis 548a and 548b, over-center spring 556 supplies the additional force necessary to move selector valve member 552 into a second position closing venturi 548b, as is shown in FIG. 34. The next intermittent release of water from water accumulator tank 560 will, therefore, be directed through venturi 548a to conduit 542a and out nozzle 540a.

Thus, in accordance with an additional aspect of this embodiment, the intermittent releases of water from accumulator tank 560 may be alternately directed through water spraying nozzles 540a and 540b to supply water alternately as well as intermittently on opposite sides of the sprinkler as it travels across the field, as is depicted diagrammatically in FIG. 28.

Also, as contemplated within another aspect of the embodiment, a low precipitation rate of water flow may be applied in field areas closely adjacent to the sprinkler due to constant water flow through the relatively small nozzles 510a and 510b whose orifice diameter for driving the water turbine may be on the order of about 0.04 inches. The larger diameter orifices of nozzles 540a and 540b, on the order of 0.4 inches, may be used to supply water at the more distant areas from the sprinkler end at a low precipitation rate due to the intermittent nature of the spray as explained hereinbefore.

From the foregoing description of various exemplary embodiments of the present invention in improved traveling and intermittently spraying agricultural sprinklers, it should be readily apparent to those skilled in the art that the aforestated objects of the present invention have been achieved. While the invention has been described in detail, with particular reference to certain exemplary embodiments thereof, it is to be understood that numerous modifications thereof may be made by one skilled in the art and still come within the scope and spirit of the invention, which is ony limited by the terms of the following claims.

I claim:

1. A system for irrigating an agricultural field, comprising:
   a pair of stop means positioned on opposite sides of the field and defining therebetween an area to be irrigated,
   an intermittent sprinkler means, including means for accumulating a volume of water, and means for intermittently discharging an accumulated volume of water in a long distance irrigating spray,
   a mobile base for said sprinkler means,
   means for supplying the sprinkler means with water,
   water powered means for propelling said base across the field between said pair of stops,
   means for diverting water from said sprinkler means to power said propelling means, and
   means carried by said sprinkler means and engageable with said stops to reverse the direction of sprinkler travel when the sprinkler means approaches a stop,
   said intermittent sprinkler means operating with a relatively greater volumetric rate of water flow than said water powered propelling means.

2. The irrigation system of claim 1, and further including a plurality of pairs of stop means positioned on opposite sides of said field and defining a field to be irrigated between the members of each of said plurality of pairs, and a corresponding plurality of sprinkler means associated respectively with each of said pairs, each of said sprinkler means comprising a water supply means, means for accumulating a volume of water, means for intermittently discharging an accumulated volume of water in a long distance irrigating spray, a base, water powered means for propelling said base across said field between its respective pair of stops, means for diverting water from said sprinkler means to power said propelling means, and means carried by said sprinkler means and engageable with its respective stops for reversing the direction of sprinkler travel when the sprinkler approaches one of said stops.

3. The irrigation system of claim 1, and further including a plurality of pairs of stop means with the members of each pair positioned on opposite sides of said field to define an area to be irrigated therebetween, said intermittent sprinkler means being moveable successively from one pair of stop means to the next pair after irrigating the field area associated with said one pair.

4. A system for irrigating an agricultural field, comprising:
   a pair of stop means positioned on opposite sides of the field and defining therebetween an area to be irrigated,
   an intermittent sprinkler means, including means for accumulating a volume of water, and means for intermittently discharging an accumulated volume of water in a long distance irrigating spray,
   a mobile base for said sprinkler means,
   means for supplying the sprinkler means with water,
   water powered means for propelling said base across the field between said pair of stops,
   means for diverting water from said sprinkler means to power said propelling means, and
   means carried by said sprinkler means and engageable with said stops to reverse the direction of sprinkler travel when the sprinkler means approaches a stop,
   said propelling means comprising:
      a guide wire extending generally between said stops,
      drive means carried by the sprinkler base and engaging said guide wire, and
      water powered means for actuating said drive means to move against said guide wire and thereby propel the sprinkler base across said field, said drive actuating means including means for receiving water diverted from said sprinkler means,
   said intermittent sprinkler means operating with a relatively greater volumetric rate of water flow than said water powered propelling means.

5. The irrigation system of claim 4, said drive actuating means comprising a rotatable water wheel drive actuator, and means for directing water diverted from said sprinkler means against said water wheel, whereby the wheel is rotated to actuate the sprinkler drive means.

6. A system for irrigating an agricultural field, comprising:
   a pair of stop means positioned on opposite sides of the field and defining therebetween an area to be irrigated,
   an intermittent sprinkler means, including means for accumulating a volume of water, and means for intermittently discharging an accumulated volume of water in an irrigating spray,
   a mobile base for said sprinkler means,
   means for supplying the sprinkler means with water,
   means for propelling said base across the field between said pair of stops, and
   means carried by said sprinkler means and engageable with said stops to reverse the direction of sprinkler travel when the sprinkler means approaches a stop,
   said sprinkler means being adapted to intermittently discharge a stream of water generally in a first direction during transit from a first to the other of said stop means, and further including means associated with said stop engaging means for generally reversing the direction of sprinkler spray when said sprinkler means reaches said other stop means.

7. An agricultural sprinkler for irrigating an area of a field, comprising:
a mobile base,
water supply means,
sprinkler means mounted on said base, said sprinkler means including means including means to accumulate water from said supply, and to intermittently discharge a stream of accumulated water in a long distance irrigating spray,
water powered means for propelling said base across a field to be irrigated, and
means for diverting water from said sprinkler means to power said propelling means,
said intermittent sprinkler means operating with a relatively greater volumetric rate of water flow than said water propelling means.

8. The agricultural sprinkler of claim 7, wherein said base is portable.

9. The agricultural sprinkler of claim 7, said propelling means being substantially continually operable.

10. The agricultural sprinkler of claim 7, said accumulator means comprising an accumulator tank having pressure responsive means therein for discharging a stream of irrigating water when the pressure of the water accumulated in the tank exceeds a predetermined threshold.

11. The agricultural sprinkler of claim 10, said accumulator tank including a resiliently expandable reservoir means secured within said tank to expand substantially circumferentially in a direction generally lateral to the water discharge direction, and means for directing the water supply to said reservoir means, whereby said reservoir means expands during accumulation of water to partially retard the build up of water pressure in said tank, and thereby enables a greater volume of water to be accumulated and discharged during a given discharge.

12. The agricultural sprinkler of claim 7, said base propelling means comprising means for engaging a guide wire disposed across an agricultural field, and water powered means for propelling said base along said guide wire, said water powered means including means for receiving water diverted from said sprinkler means.

13. The agricultural sprinkler of claim 12, said base propulsion means comprising a drive wheel engageable with said guide wire, and said water powered means being adapted to rotate said drive wheel to propel said sprinkler along said wire.

14. The agricultural sprinkler of claim 13, said drive wheel comprising a pulley adapted to secure a guide wire wrapped around its rim.

15. The agricultural sprinkler of claim 7, said base propelling means including a water wheel drive actuator means, means for forming water diverted from said sprinkler means into a continual jet and directing the water jet thus against said water wheel to rotate said water wheel and thereby actuate the base propelling means.

16. The agricultural sprinkler of claim 15, said jet forming means directing said water jet in a continual irrigating stream to a zone generally closer to the sprinkler means than said long distance intermittent spray.

17. The agricultural sprinkler of claim 7, further comprising means on said base adapted to engage a field stop when the sprinkler has traversed a portion of a field, and means for reversing the direction of sprinkler travel in response to said engagement.

18. The agricultural sprinkler of claim 7, further comprising moveable means controlling the direction of base propulsion, and a shift rod means carried on said base and engageable with a field stop means when the sprinkler approaches said stop means, to shift said propulsion control means to a position reversing the direction of base propulsion.

19. An agricultural sprinkler for irrigating an area of a field, comprising:
a mobile base,
water supply means,
sprinkler means mounted on said base, said sprinkler means including means to accumulate water from said supply, and to intermittently discharge a stream of accumulated water in a long distance irrigating spray,
water powered means for propelling said base across a field to be irrigated, and
means for diverting water from said sprinkler means to power said propelling means,
said base propelling means including a water wheel drive actuator means, means for forming water diverted from said sprinkler means into a continuous jet and directing the water jet against said water wheel to rotate said water wheel and thereby actuate the base propelling means,
said jet forming means comprising means for continuously emitting a pair of spaced water jets, one of said water jets being directable to rotate the water wheel in one direction, and the other of said jets being directable to rotate the water wheel in the opposite direction, and further including jet control means for controllably directing one jet at a time against said water wheel and the other jet away from said water wheel.

20. The agricultural sprinkler of claim 19, further comprising shift means disposed for engagement with a field stop when the sprinkler has completed traversing a field, said jet control means being responsive to said shift means engaging a field stop to exchange one water jet for the other for direction against the water wheel, and thereby reverse the direction of sprinkler travel over the field.

21. An agricultural sprinkler for irrigating an area of a field, comprising:
a mobile base,
water supply means,
sprinkler means mounted on said base, said sprinkler means adapted to discharge a directional stream, and including means to accumulate water from said supply, and to intermittently discharge a stream of accumulated water,
means for propelling said base across a field to be irrigated, and
stream reversal means carried on said base, said stream reversal means being engageable with a field stop means to generally reverse the direction of intermittent irrigating discharge in response to said engagement.

22. An agricultural sprinkler for irrigating an area of a field, comprising:
a mobile base,
water supply means, sprinkler means mounted on said base, said sprinkler means including means to accumulate water from said supply, and to intermittently discharge a stream of accumulated water in a long distance irrigating spray, water powered means for propelling said base across a field to be irrigated, means for diverting water from said sprinkler means to power said propelling means, moveable means controlling the direction in which irrigating water is discharged from the sprinkler, and a shift rod means carried on said base and engageable with a field stop means when the sprinkler approaches said stop means, to shift said discharge control means to a position reversing the general discharge direction.

23. The agricultural sprinkler of claim 22, further comprising moveable means controlling the direction of base travel, said discharge direction control means coupling said travel direction control means with said shift rod means, whereby reversal of the discharge in response to the shift rod means engaging a field stop means imparts a corresponding reversal to the base travel direction.

24. The agricultural sprinkler of claim 23, said discharge direction control means engaging said travel direction control means to reverse the direction of travel substantially at the completion of a reversal of the spray direction.

25. A method of irrigating a field, comprising:
propelling an intermittent sprinkler means across a field,
supplying said sprinkler means with irrigating water,
accumulating said water in said sprinkler means,
intermittently discharging accumulated water from said sprinkler in a long distance irrigating stream,
reversing the direction of sprinkler travel and when the sprinkler means reaches the end of the field, and
reversing the general direction of water discharge when the sprinkler travel direction is reversed.

26. In a traveling sprinkler system having a mobile base, a sprinkler means mounted on said base, and means for supplying irrigating water to said sprinkler means for long distance discharge over a field, the improvement comprising drive means for said base, said drive means comprising:
a guide wire extending across a field to be irrigated,
means anchoring opposed ends of said guide wire with respect to said field,
rotational drive means carried by said base and engaging said wire, the rotational direction of said rotational drive means determining the travel direction of said base with respect to said guide wire,
a water wheel means rotatably supported on said base,
means for forming a portion of the water from said water supply means in a jet separate from the sprinkler means discharge and directing said jet rotationally against said water wheel, and
drive shaft means coupling said water to said rotational drive means to translate water wheel rotation to a movement of said drive means against the guide wire,
said jet means comprising a double orifice jet relatively moveable with respect to said water wheel means, one of said orifice being positionable to emit a first jet which rotates the water wheel in one direction, and the other of said orifices being positionable to emit a first jet which rotates the water wheel in one direction, and the other of said orifices being positionable to emit a second jet which rotates the water wheel in the opposite direction, said orifices being mutually arranged so that the jet from one but not the other impacts the water wheel to propel the base in a first position, and further including means responsive to the sprinkler approaching a field stop means for moving said jet means relative to the water wheel so that the other jet impacts the water wheel, and thereby reversing the direction of sprinkler travel.

27. The apparatus of claim 26, said jet orifices directing their respective water streams outwardly from said sprinkler means to supplement the irrigation provided by said sprinkler means.

28. The apparatus of claim 26, said drive shaft means including means providing a rotational gear reduction from said water wheel to said rotational drive means.

29. In a traveling sprinkler system having a mobile base, a sprinkler means mounted on said base, and means for supplying irrigating water to said sprinkler means for discharge over a field, the improvement comprising drive means for said base, said drive means comprising:
a guide wire extending across a field to be irrigated,
means anchoring opposed ends of said guide wire with respect to said field,
rotational drive means carried by said base and engaging said wire, the rotational direction of said rotational drive means determining the travel direction of said base with respect to said guide wire,
a water wheel means rotatably supported on said base,
means for forming a portion of the water from said water supply means in a jet and directing said jet rotationally against said water wheel,
said jet means comprising a double orifice jet, one of said orifices being positionable to emit a first jet which rotates the water wheel in one direction, and the other of said orifices being positionable to emit a second jet which rotates the water wheel in the opposite direction, said orifices being mutually arranged so that the jet from one but not the other impacts the water wheel to propel the base in a first position,
means responsive to the sprinkler approaching a field stop means for adjusting said jet means so that the other jet impacts the water wheel, and thereby reversing the direction of sprinkler travel, and an upstanding pedestal rotatably carried on said base, said sprinkler, jet means and water wheel all being mounted on said pedestal, and further including means for rotating said pedestal when the sprinkler approaches a field stop, said jet adjusting means being operatively responsive to rotation of said pedestal.

30. The apparatus of claim 20, including a control rod means rotatably mounted on said pedestal for controlling the position of said jet means relative to the water wheel, and means coupling the control rod means to the base to rotate said control rod means relative to said pedestal when said pedestal rotates relative to said base, and thereby adjust said jet means.

31. The apparatus of claim 30, said coupling means being adapted to rotate said control rod relative to said pedestal only when said pedestal has been substantially fully rotated relative to the sprinkler base.

32. The apparatus of claim 21, said coupling means comprising a spring connected at one end to the base and at the other end to a pin extending laterally from said control rod means.

33. The apparatus of claim 29, said pedestal rotating means comprising an axially translatable shift rod means mounted on said base and positioned to engage a field stop and be shifted thereby as the sprinkler approaches the stop, circumferential rotation receiving means on said pedestal, and means coupling said shift rod with said rotation receiving means to impart a rotation to said pedestal in response to shifting of said shift rod.

34. The apparatus of claim 33, said pedestal rotation receiving means comprising a pulley means mounted circumferentially around said pedestal, and said coupling means comprising a wire having its ends attached to mutually spaced locations on said shift rod and an intermediate portion encircling said pulley.

35. In a traveler sprinkling system having a mobile base, sprinkler means mounted on said base, means for supplying water to said sprinkler means for long distance distribution over a field, wire means guiding the travel of said base, and means anchoring said guide wire to the field, the improvement comprising sprinkler drive apparatus comprising a drive pulley carried by said base and encircled by said guide wire, and means for rotating said pulley to move said base along said guide wire, said means supplied by said water supply means for forming first and second continuous water jets, said jet means being moveable between first and second positions respectively directing said first and second jets to rotate said water wheel in respective first and second directions, and drive shaft means rotationally coupling said water wheel to said drive pulley.

36. The traveling sprinkler system of claim 35, and further including transmission means associated with said drive shaft means providing a gear reduction between said water wheel and said drive pulley 37. In a traveler sprinkler system having a mobile base, sprinkler means adapted to discharge a directional irrigating stream mounted on said base, means for supplying water to said sprinkler means for distribution over a field, wire means guiding the travel of said base, and means anchoring said guide wire to the field, the improvement comprising sprinkler drive apparatus comprising:
 a drive pulley carried by said base and encircled by said guide wire,
 means for rotating said pulley to move said base along said guide wire,
 a rotatable sprinkler support means carried on said base, and
 pivot means coupling said drive pulley with said rotatable support means to oscillate said support means in a reciprocating rotary motion and thereby cause the discharge stream to traverse an arc as said pulley rotates.

38. The traveling sprinkler system of claim 37, further comprising means for rotating said sprinkler support means to reverse the discharge direction, said pivot means including a resilient link means adapted to absorb excess rotation of the sprinkler support means beyond the oscillating range when said support means rotates to reverse the discharge direction.

39. The traveling sprinkler system of claim 37, said pivot means comprising a bell crank mounted on the sprinkler base, a first pivot arm pivotally connected at one end to said drive pulley and at the other end to said bell crank, and a second pivot arm pivotally connected at one end to said sprinkler support means and at the other end to said bell crank.

40. The traveling sprinkler system of claim 39, said second pivot arm comprising a first link pivotally attached to said sprinkler support means, a second link pivotally attached to said bell crank, and spring means mutually coupling said first and second links to permit relative axial motion therebetween, said spring means being adapted to absorb excess axial movement of said first link when said support means rotates beyond the oscillating range when the discharge direction is reversed.

* * * * *